United States Patent
Eisen et al.

(10) Patent No.: US 10,726,151 B2
(45) Date of Patent: Jul. 28, 2020

(54) METHODS AND APPARATUS FOR SECURELY DISPLAYING DIGITAL IMAGES

(71) Applicant: The 41st Parameter, Inc., Scottsdale, AZ (US)

(72) Inventors: Ori Eisen, Scottsdale, AZ (US); Raz Yalov, Scottsdale, AZ (US)

(73) Assignee: The 41st Parameter, Inc., Scottsdale, AZ (US)

( * ) Notice: Subject to any disclaimer, the term of this patent is extended or adjusted under 35 U.S.C. 154(b) by 0 days.

(21) Appl. No.: 15/619,331

(22) Filed: Jun. 9, 2017

(65) Prior Publication Data

US 2018/0089459 A1     Mar. 29, 2018

Related U.S. Application Data

(63) Continuation of application No. 14/580,085, filed on Dec. 22, 2014, now Pat. No. 9,703,983, which is a
(Continued)

(51) Int. Cl.
*G06F 16/30* (2019.01)
*G06F 21/62* (2013.01)
(Continued)

(52) U.S. Cl.
CPC .......... *G06F 21/6245* (2013.01); *G06F 21/84* (2013.01); *G06F 40/166* (2020.01);
(Continued)

(58) Field of Classification Search
None
See application file for complete search history.

(56) References Cited

U.S. PATENT DOCUMENTS

| | | |
|---|---|---|
| 4,805,222 A | 2/1989 | Young et al. |
| 4,912,761 A | 3/1990 | Tan et al. |

(Continued)

FOREIGN PATENT DOCUMENTS

| | | |
|---|---|---|
| EP | 0 418 144 | 3/1991 |
| EP | 0 645 692 | 3/1995 |

(Continued)

OTHER PUBLICATIONS

Official Communication in European Patent Application No. 05818903.6, dated Jul. 18, 2017.

(Continued)

*Primary Examiner* — Sanchita Roy
(74) *Attorney, Agent, or Firm* — Knobbe, Martens, Olson & Bear, LLP

(57) ABSTRACT

The invention provides methods and apparatus for securing personalized or sensitive information appearing in digital images. Digital images containing information to be secured is processed and divided into a plurality of image cells. At least one image cell from the plurality of image cells is selected and redacted or altered to render the information to be secured with the selected image cells indecipherable. The invention also provides methods and apparatus for transmitting or streaming unredacted image cells alone or in combination with redacted image cells for secured viewing on a user browser or computer.

14 Claims, 11 Drawing Sheets

Related U.S. Application Data continuation of application No. 11/769,674, filed on Jun. 27, 2007, now Pat. No. 8,938,671, which is a continuation-in-part of application No. 11/612,425, filed on Dec. 18, 2006, now Pat. No. 8,612,854.

(60) Provisional application No. 60/751,188, filed on Dec. 16, 2005.

(51) Int. Cl.
| | | |
|---|---|---|
| *G06F 21/84* | (2013.01) | |
| *H04N 1/00* | (2006.01) | |
| *G06F 40/166* | (2020.01) | |
| *H04N 1/44* | (2006.01) | |

(52) U.S. Cl.
CPC ..... *H04N 1/00864* (2013.01); *H04N 1/00872* (2013.01); *H04N 1/4486* (2013.01)

(56) References Cited

U.S. PATENT DOCUMENTS

| | | |
|---|---|---|
| 4,924,387 A | 5/1990 | Jeppesen |
| 5,184,849 A | 2/1993 | Taylor |
| 5,491,735 A | 2/1996 | Hsieh |
| 5,519,827 A | 5/1996 | Mizushima |
| 5,521,907 A | 5/1996 | Ennis, Jr. |
| 5,557,686 A | 9/1996 | Brown et al. |
| 5,627,886 A | 5/1997 | Bowman |
| 5,679,940 A | 10/1997 | Templeton et al. |
| 5,721,765 A | 2/1998 | Smith |
| 5,724,424 A | 3/1998 | Giffor |
| 5,748,740 A | 5/1998 | Curry et al. |
| 5,748,780 A | 5/1998 | Stolfo et al. |
| 5,764,275 A | 6/1998 | Lappington et al. |
| 5,802,156 A | 9/1998 | Felger |
| 5,819,226 A | 10/1998 | Gopinathan et al. |
| 5,864,620 A | 1/1999 | Pettitt |
| 5,884,289 A | 3/1999 | Anderson et al. |
| 5,886,334 A | 3/1999 | D'Entremont |
| 5,892,900 A | 4/1999 | Ginter et al. |
| 5,894,510 A | 4/1999 | Felger |
| 5,899,980 A | 5/1999 | Wilf et al. |
| 5,903,646 A | 5/1999 | Rackman |
| 5,903,721 A | 5/1999 | Sixtus |
| 5,933,480 A | 8/1999 | Felger |
| 5,960,069 A | 9/1999 | Felger |
| 6,009,523 A | 12/1999 | Owaki et al. |
| 6,029,154 A | 2/2000 | Pettitt |
| 6,029,159 A | 2/2000 | Zorba et al. |
| 6,062,474 A | 5/2000 | Kroll |
| 6,078,907 A | 6/2000 | Lamm |
| 6,092,053 A | 7/2000 | Boesch et al. |
| 6,094,643 A | 7/2000 | Anderson et al. |
| 6,105,012 A | 8/2000 | Chang et al. |
| 6,112,240 A | 8/2000 | Pogue et al. |
| 6,148,407 A | 11/2000 | Aucsmith |
| 6,151,593 A | 11/2000 | Cho et al. |
| 6,163,604 A | 12/2000 | Baulier et al. |
| 6,163,771 A | 12/2000 | Walker et al. |
| 6,164,528 A | 12/2000 | Hills et al. |
| 6,205,436 B1 | 3/2001 | Rosenberg et al. |
| 6,209,104 B1 | 3/2001 | Jalili |
| 6,216,153 B1 | 4/2001 | Vortriede |
| 6,223,289 B1 | 4/2001 | Wall et al. |
| 6,282,276 B1 | 8/2001 | Felger |
| 6,295,605 B1 | 9/2001 | Dockter et al. |
| 6,327,384 B1 | 12/2001 | Hirao et al. |
| 6,330,546 B1 | 12/2001 | Gopinathan et al. |
| 6,405,922 B1 | 6/2002 | Kroll |
| 6,442,529 B1 | 8/2002 | Krishan et al. |
| 6,442,692 B1 | 8/2002 | Zilberman |
| 6,457,021 B1 | 9/2002 | Berkowitz et al. |
| 6,480,710 B1 | 11/2002 | Laybourn et al. |
| 6,509,847 B1 | 1/2003 | Anderson |
| 6,523,019 B1 | 2/2003 | Borthwick |
| 6,546,493 B1 | 4/2003 | Magdych et al. |
| 6,553,108 B1 | 4/2003 | Felger |
| 6,560,455 B2 | 5/2003 | Amin et al. |
| 6,567,099 B1 | 5/2003 | Dawson |
| 6,597,775 B2 | 7/2003 | Lawyer et al. |
| 6,646,765 B1 | 11/2003 | Barker et al. |
| 6,678,666 B1 | 1/2004 | Boulware |
| 6,687,390 B2 | 2/2004 | Avni et al. |
| 6,687,696 B2 | 2/2004 | Hofmann et al. |
| 6,689,055 B1 | 2/2004 | Mullen et al. |
| 6,718,363 B1 | 4/2004 | Ponte |
| 6,745,333 B1 | 6/2004 | Thomsen |
| 6,803,920 B2 | 10/2004 | Gossett et al. |
| 6,804,624 B2 | 10/2004 | Silverman |
| 6,850,606 B2 | 2/2005 | Lawyer et al. |
| 6,892,307 B1 | 5/2005 | Wood et al. |
| 6,895,507 B1 | 5/2005 | Tepler |
| 6,895,514 B1 | 5/2005 | Kermani |
| 6,898,709 B1 | 5/2005 | Teppler |
| 6,908,030 B2 | 6/2005 | Rajasekaran et al. |
| 6,937,569 B1 | 8/2005 | Sarkar et al. |
| 6,947,978 B2 | 9/2005 | Huffman |
| 6,954,532 B1 | 10/2005 | Handley et al. |
| 6,957,185 B1 | 10/2005 | Labaton |
| 6,957,339 B2 | 10/2005 | Shinzaki |
| 7,002,712 B2 | 2/2006 | Barker et al. |
| 7,003,670 B2 | 2/2006 | Heaven et al. |
| 7,007,174 B2 | 2/2006 | Wheeler et al. |
| 7,013,001 B1 | 3/2006 | Felger |
| 7,027,800 B2 | 4/2006 | Haumont et al. |
| 7,039,505 B1 | 5/2006 | Southard et al. |
| 7,039,699 B1 | 5/2006 | Narin et al. |
| 7,043,640 B2 | 5/2006 | Pritchard et al. |
| 7,089,310 B1 | 8/2006 | Ellerman et al. |
| 7,089,585 B1 | 8/2006 | Dharmarajan |
| 7,096,192 B1 | 8/2006 | Pettitt |
| 7,100,049 B2 | 8/2006 | Gasparini et al. |
| 7,103,570 B1 | 9/2006 | Morea et al. |
| 7,120,590 B1 | 10/2006 | Eisen et al. |
| 7,130,858 B2 | 10/2006 | Ciaramitaro et al. |
| 7,143,095 B2 | 11/2006 | Barrett et al. |
| 7,158,622 B2 | 1/2007 | Lawyer et al. |
| 7,165,051 B2 | 1/2007 | Ronning et al. |
| 7,174,454 B2 | 2/2007 | Roskind |
| 7,191,467 B1 | 3/2007 | Dujari et al. |
| 7,197,646 B2 | 3/2007 | Fritz et al. |
| 7,221,949 B2 | 5/2007 | Clough |
| 7,225,974 B2 | 6/2007 | Yamauchi |
| 7,237,717 B1 | 7/2007 | Rao et al. |
| 7,249,093 B1 | 7/2007 | King |
| 7,251,624 B1 | 7/2007 | Lee et al. |
| 7,260,837 B2 | 8/2007 | Abraham et al. |
| 7,263,492 B1 | 8/2007 | Suresh et al. |
| 7,263,506 B2 | 8/2007 | Lee et al. |
| 7,272,610 B2 | 9/2007 | Torres |
| 7,272,728 B2 | 9/2007 | Pierson et al. |
| 7,292,723 B2 | 11/2007 | Tedesco et al. |
| 7,293,096 B1 | 11/2007 | Foltak et al. |
| 7,296,088 B1 | 11/2007 | Padmanabhan et al. |
| 7,328,216 B2 | 2/2008 | Hofmann et al. |
| 7,330,824 B1 | 2/2008 | Kanojia et al. |
| 7,330,871 B2 | 2/2008 | Barber |
| 7,340,045 B2 | 3/2008 | Felger |
| 7,346,551 B2 | 3/2008 | Pe Jimenez et al. |
| 7,346,775 B2 | 3/2008 | Gasparinl et al. |
| 7,349,955 B1 | 3/2008 | Korb et al. |
| 7,359,962 B2 | 4/2008 | Willebeek-LeMair et al. |
| 7,363,170 B2 | 4/2008 | Seul et al. |
| 7,373,669 B2 | 5/2008 | Eisen |
| 7,376,618 B1 | 5/2008 | Anderson et al. |
| 7,379,891 B1 | 5/2008 | Donner et al. |
| 7,404,087 B2 | 6/2008 | Teunen |
| 7,401,082 B2 | 7/2008 | Keene et al. |
| 7,403,922 B1 | 7/2008 | Lewis et al. |
| 7,406,441 B2 | 7/2008 | Kimura et al. |
| 7,428,587 B2 | 9/2008 | Rowland et al. |
| 7,436,780 B2 | 10/2008 | Stephens |
| 7,438,226 B2 | 10/2008 | Helsper et al. |

(56) References Cited

U.S. PATENT DOCUMENTS

| | | |
|---|---|---|
| 7,447,494 B2 | 11/2008 | Law et al. |
| 7,451,487 B2 | 11/2008 | Oliver et al. |
| 7,457,401 B2 | 11/2008 | Lawyer et al. |
| 7,457,823 B2 | 11/2008 | Shraim et al. |
| 7,475,242 B2 | 1/2009 | Baird et al. |
| 7,478,182 B2 | 1/2009 | Schweig |
| 7,487,350 B2 | 2/2009 | Utin |
| 7,496,752 B2 | 2/2009 | Yamaguchi et al. |
| 7,497,374 B2 | 3/2009 | Helsper et al. |
| 7,502,610 B2 | 3/2009 | Maher |
| 7,502,933 B2 | 3/2009 | Jakobsson et al. |
| 7,526,796 B2 | 4/2009 | Lulich et al. |
| 7,543,740 B2 | 6/2009 | Greene et al. |
| 7,552,090 B1 | 6/2009 | Barber |
| 7,555,458 B1 | 6/2009 | Felger |
| 7,562,221 B2 | 7/2009 | Nyström et al. |
| 7,577,620 B1 | 8/2009 | Donner |
| 7,581,112 B2 | 8/2009 | Brown et al. |
| 7,606,560 B2 | 10/2009 | Labrou et al. |
| 7,657,626 B1 | 2/2010 | Zwicky |
| 7,660,902 B2 | 2/2010 | Graham et al. |
| 7,665,140 B2 | 2/2010 | Oliver et al. |
| 7,665,658 B2 | 2/2010 | Fields |
| 7,673,793 B2 | 3/2010 | Greene et al. |
| 7,685,629 B1 | 3/2010 | White et al. |
| 7,698,743 B2 | 4/2010 | Ohmori et al. |
| 7,708,200 B2 | 5/2010 | Helsper et al. |
| 7,711,846 B2 | 5/2010 | Padmanabhan et al. |
| 7,735,141 B1 | 6/2010 | Noel et al. |
| 7,739,402 B2 | 6/2010 | Roese et al. |
| 7,739,512 B2 | 6/2010 | Hawkes |
| 7,743,409 B2 | 6/2010 | Gonzalez et al. |
| 7,752,084 B2 | 7/2010 | Pettitt |
| 7,756,783 B2 | 7/2010 | Crooks |
| 7,761,379 B2 | 7/2010 | Zoldi et al. |
| 7,778,846 B2 | 8/2010 | Suresh et al. |
| 7,813,937 B1 | 10/2010 | Pathria et al. |
| 7,813,944 B1 | 10/2010 | Luk et al. |
| 7,849,029 B2 | 12/2010 | Crooks et al. |
| 7,849,307 B2 | 12/2010 | Roskind |
| 7,853,526 B2 | 12/2010 | Milana |
| 7,853,533 B2 | 12/2010 | Eisen |
| 7,856,372 B2 | 12/2010 | Ullah |
| 7,860,783 B2 | 12/2010 | Yang et al. |
| 7,861,260 B2 | 12/2010 | Shkedi |
| 7,865,427 B2 | 1/2011 | Wright et al. |
| 7,882,217 B2 | 2/2011 | Katzir |
| 7,908,223 B2 | 3/2011 | Klein et al. |
| 7,908,645 B2 | 3/2011 | Varghese et al. |
| 7,930,285 B2 | 4/2011 | Abraham et al. |
| 7,933,984 B1 | 4/2011 | Smith et al. |
| 7,937,467 B2 | 5/2011 | Barber |
| 7,940,929 B1 * | 5/2011 | Sengupta ............ G06F 21/6272 380/51 |
| 7,945,494 B2 | 5/2011 | Williams |
| 7,945,515 B2 | 5/2011 | Zoldi et al. |
| 7,949,564 B1 | 5/2011 | Hughes et al. |
| 7,958,029 B1 | 6/2011 | Bobich et al. |
| 7,958,246 B2 | 6/2011 | Barber |
| 7,961,857 B2 | 6/2011 | Zoldi et al. |
| 7,970,701 B2 | 6/2011 | Lewis et al. |
| 7,983,691 B1 | 7/2011 | Wong et al. |
| 7,991,716 B2 | 8/2011 | Crooks et al. |
| 7,995,996 B2 | 8/2011 | Link, II et al. |
| 8,001,376 B2 | 8/2011 | Utin |
| 8,001,597 B2 | 8/2011 | Crooks |
| 8,015,614 B2 | 9/2011 | Matsuzaki et al. |
| 8,015,921 B2 | 9/2011 | Leppanen et al. |
| 8,019,678 B2 | 9/2011 | Wright et al. |
| 8,020,763 B1 | 9/2011 | Kowalchyk et al. |
| 8,024,266 B1 | 9/2011 | Barber |
| 8,025,220 B2 | 9/2011 | Zoldi et al. |
| 8,027,439 B2 | 9/2011 | Zoldi et al. |
| 8,032,448 B2 | 10/2011 | Anderson et al. |
| 8,037,097 B2 | 10/2011 | Guo et al. |
| 8,037,511 B1 | 10/2011 | Lundy et al. |
| 8,041,597 B2 | 10/2011 | Li et al. |
| 8,042,164 B2 | 10/2011 | Sheynblat et al. |
| 8,046,271 B2 | 10/2011 | Jimenez et al. |
| 8,060,922 B2 | 11/2011 | Crichton et al. |
| 8,065,233 B2 | 11/2011 | Lee et al. |
| 8,090,648 B2 | 1/2012 | Zoldi et al. |
| 8,108,378 B2 | 1/2012 | Ott, IV et al. |
| 8,121,962 B2 | 2/2012 | Vaiciulis et al. |
| 8,122,082 B2 | 2/2012 | Klein |
| 8,126,816 B2 | 2/2012 | Mu et al. |
| 8,131,615 B2 | 3/2012 | Diev et al. |
| 8,140,689 B2 | 3/2012 | Barber |
| 8,141,148 B2 | 3/2012 | Thomas et al. |
| 8,145,560 B2 | 3/2012 | Kulkarni et al. |
| 8,145,762 B2 | 3/2012 | Barber |
| 8,150,968 B2 | 4/2012 | Barber |
| 8,151,327 B2 | 4/2012 | Eisen |
| 8,166,068 B2 | 4/2012 | Stevens |
| 8,175,897 B2 | 5/2012 | Lee et al. |
| 8,176,178 B2 | 5/2012 | Thomas et al. |
| 8,180,686 B2 | 5/2012 | Ryu et al. |
| 8,181,015 B2 | 5/2012 | Roskind |
| 8,185,953 B2 | 5/2012 | Rothstein et al. |
| 8,190,513 B2 | 5/2012 | Felger |
| 8,190,529 B2 | 5/2012 | Abe et al. |
| 8,191,148 B2 | 5/2012 | Oliver et al. |
| 8,201,099 B1 | 6/2012 | Osbourn et al. |
| 8,204,833 B2 | 6/2012 | Mu et al. |
| 8,209,744 B2 | 6/2012 | Zhu et al. |
| 8,209,760 B1 | 6/2012 | Hardman |
| 8,213,898 B2 | 7/2012 | Choti et al. |
| 8,214,232 B2 | 7/2012 | Tyler et al. |
| 8,214,285 B2 | 7/2012 | Hu et al. |
| 8,219,415 B2 | 7/2012 | Tyler et al. |
| 8,224,348 B2 | 7/2012 | Bolon et al. |
| 8,229,844 B2 | 7/2012 | Felger |
| 8,250,631 B2 | 8/2012 | Iyengar et al. |
| 8,266,295 B2 | 9/2012 | Klein et al. |
| 8,271,891 B1 | 9/2012 | Osbourn et al. |
| 8,280,833 B2 | 10/2012 | Miltonberger |
| 8,290,838 B1 | 10/2012 | Thakur et al. |
| 8,295,898 B2 | 10/2012 | Ashfield et al. |
| 8,296,228 B1 | 10/2012 | Kloor |
| 8,296,229 B1 | 10/2012 | Yellin et al. |
| 8,296,245 B2 | 10/2012 | Barber et al. |
| 8,296,250 B2 | 10/2012 | Crooks et al. |
| 8,306,933 B2 | 11/2012 | Kawai et al. |
| 8,307,430 B1 | 11/2012 | Chen et al. |
| 8,311,907 B2 | 11/2012 | Klein et al. |
| 8,321,269 B2 | 11/2012 | Linden et al. |
| 8,326,759 B2 | 12/2012 | Hammad |
| 8,326,760 B2 | 12/2012 | Ma et al. |
| 8,326,763 B2 | 12/2012 | Zuili |
| 8,332,338 B2 | 12/2012 | Vaiciulis et al. |
| 8,332,522 B2 | 12/2012 | Barber |
| 8,370,253 B1 | 2/2013 | Grossman et al. |
| 8,370,638 B2 | 2/2013 | Duane et al. |
| 8,380,831 B2 | 2/2013 | Barber |
| 8,392,987 B2 | 3/2013 | Sasamura et al. |
| 8,407,112 B2 | 3/2013 | Walter |
| 8,407,798 B1 | 3/2013 | Lotem et al. |
| 8,417,587 B2 | 4/2013 | Jimenez et al. |
| 8,423,458 B2 | 4/2013 | Barber |
| 8,424,061 B2 | 4/2013 | Rosenor |
| 8,429,070 B2 | 4/2013 | Hu et al. |
| 8,438,184 B1 | 5/2013 | Wang |
| 8,443,202 B2 | 5/2013 | White et al. |
| 8,452,715 B2 | 5/2013 | Barber |
| 8,453,226 B2 | 5/2013 | Hammad |
| 8,462,161 B1 | 6/2013 | Barber |
| 8,464,290 B2 | 6/2013 | Beyda et al. |
| 8,468,582 B2 | 6/2013 | Kuang et al. |
| 8,484,470 B2 | 7/2013 | Sakakihara et al. |
| 8,495,714 B2 | 7/2013 | Jones et al. |
| 8,516,439 B2 | 8/2013 | Brass et al. |
| 8,539,070 B2 | 9/2013 | Barber |
| 8,543,522 B2 | 9/2013 | Ryman-Tubb et al. |
| 8,548,137 B2 | 10/2013 | Zoldi et al. |

(56) References Cited

U.S. PATENT DOCUMENTS

| | | |
|---|---|---|
| 8,559,607 B2 | 10/2013 | Zoldi et al. |
| 8,567,669 B2 | 10/2013 | Griegel et al. |
| 8,588,816 B2 | 11/2013 | Collins |
| 8,601,109 B2 | 12/2013 | Johannsen |
| 8,611,856 B2 | 12/2013 | Yan et al. |
| 8,612,854 B2 | 12/2013 | Eisen et al. |
| 8,660,539 B2 | 2/2014 | Khambete et al. |
| 8,683,561 B2 | 3/2014 | Utin |
| 8,688,543 B2 | 4/2014 | Dominguez |
| 8,751,815 B2 | 6/2014 | Lunde et al. |
| 8,762,283 B2 | 6/2014 | Gerber et al. |
| 8,762,574 B2 | 6/2014 | Barber |
| 8,763,113 B2 | 6/2014 | Thomas et al. |
| 8,776,225 B2 | 7/2014 | Pierson et al. |
| 8,779,981 B2 | 7/2014 | Eisen et al. |
| 8,781,975 B2 | 7/2014 | Bennett et al. |
| 8,782,783 B2 | 7/2014 | Thomas et al. |
| 8,799,458 B2 | 8/2014 | Barber |
| 8,817,984 B2 | 8/2014 | Miller et al. |
| 8,826,393 B2 | 9/2014 | Eisen |
| 8,838,478 B2 | 9/2014 | Kretz et al. |
| 8,838,967 B1 | 9/2014 | Mills et al. |
| 8,862,514 B2 | 10/2014 | Eisen |
| 8,862,526 B2 | 10/2014 | Miltonberger |
| 8,881,288 B1 | 11/2014 | Levy et al. |
| 8,938,671 B2 | 1/2015 | Eisen et al. |
| 8,954,560 B2 | 2/2015 | Johannsen |
| 8,966,276 B2 | 2/2015 | Nanopoulos et al. |
| 9,060,012 B2 | 6/2015 | Eisen |
| 9,083,735 B2 | 7/2015 | Reumann et al. |
| 9,098,617 B1 | 8/2015 | Pauley, Jr. et al. |
| 9,112,850 B1 | 8/2015 | Eisen |
| 9,118,646 B2 | 8/2015 | Pierson et al. |
| 9,191,370 B2 | 11/2015 | Barber et al. |
| 9,196,004 B2 | 11/2015 | Eisen |
| 9,203,837 B2 | 12/2015 | Pierson et al. |
| 9,294,448 B2 | 3/2016 | Miller et al. |
| 9,298,677 B2 | 3/2016 | Tollinger et al. |
| 9,332,020 B2 | 5/2016 | Thomas et al. |
| 9,361,597 B2 | 6/2016 | Britton et al. |
| 9,378,500 B2 | 6/2016 | Jimenez et al. |
| 9,390,384 B2 | 7/2016 | Eisen |
| 9,396,331 B2 | 7/2016 | Eisen et al. |
| 9,412,123 B2 | 8/2016 | Eisen |
| 9,514,248 B1 | 12/2016 | Guan et al. |
| 9,521,161 B2 | 12/2016 | Reumann et al. |
| 9,521,551 B2 | 12/2016 | Eisen et al. |
| 9,559,852 B2 | 1/2017 | Miller et al. |
| 9,633,201 B1 | 4/2017 | Katz |
| 9,703,983 B2 | 7/2017 | Eisen et al. |
| 9,754,256 B2 | 9/2017 | Britton et al. |
| 9,754,311 B2 | 9/2017 | Eisen |
| 9,781,151 B1 | 10/2017 | McCorkendale et al. |
| 9,785,973 B2 | 10/2017 | Tollinger et al. |
| 9,948,629 B2 | 4/2018 | Eisen |
| 9,990,631 B2 | 6/2018 | Eisen |
| 10,021,099 B2 | 7/2018 | Eisen et al. |
| 10,089,679 B2 | 10/2018 | Eisen |
| 10,091,312 B1 | 10/2018 | Khanwalkar et al. |
| 10,339,306 B1 | 7/2019 | Katz |
| 10,341,344 B2 | 7/2019 | Eisen et al. |
| 10,395,252 B2 | 8/2019 | Eisen |
| 10,417,637 B2 | 9/2019 | Eisen |
| 10,453,066 B2 | 10/2019 | Eisen |
| 2001/0011243 A1 | 8/2001 | Dembo et al. |
| 2001/0011304 A1 | 8/2001 | Wesigner et al. |
| 2001/0016840 A1 | 8/2001 | Hijikata et al. |
| 2001/0016876 A1 | 8/2001 | Kurth et al. |
| 2001/0018739 A1 | 8/2001 | Anderson et al. |
| 2001/0034712 A1 | 10/2001 | Colvin |
| 2001/0046096 A1 | 11/2001 | Worden |
| 2002/0035622 A1 | 3/2002 | Barber |
| 2002/0041328 A1 | 4/2002 | LeCompte et al. |
| 2002/0046157 A1 | 4/2002 | Solomon |
| 2002/0052852 A1 | 5/2002 | Bozeman |
| 2002/0056042 A1 | 5/2002 | van der Kaay et al. |
| 2002/0073046 A1 | 6/2002 | David |
| 2002/0073327 A1 | 6/2002 | Vellandi |
| 2002/0083079 A1 | 6/2002 | Meier et al. |
| 2002/0107853 A1 | 8/2002 | Hofmann et al. |
| 2002/0112171 A1 | 8/2002 | Ginter et al. |
| 2002/0128917 A1 | 9/2002 | Grounds |
| 2002/0138335 A1 | 9/2002 | Palmer et al. |
| 2002/0138577 A1 | 9/2002 | Teng et al. |
| 2002/0153424 A1 | 10/2002 | Li |
| 2002/0156724 A1 | 10/2002 | Levchin et al. |
| 2002/0156836 A1 | 10/2002 | Janosik, Jr. et al. |
| 2002/0166063 A1 | 11/2002 | Lachman et al. |
| 2002/0167965 A1 | 11/2002 | Beasley et al. |
| 2003/0002732 A1 | 1/2003 | Gossett et al. |
| 2003/0002740 A1 | 1/2003 | Melikian et al. |
| 2003/0014327 A1 | 1/2003 | Skantze |
| 2003/0033161 A1 | 2/2003 | Walker et al. |
| 2003/0033356 A1 | 2/2003 | Tran et al. |
| 2003/0070080 A1 | 4/2003 | Rosen |
| 2003/0074301 A1 | 4/2003 | Solomon |
| 2003/0076242 A1 | 4/2003 | Burns et al. |
| 2003/0105707 A1 | 6/2003 | Audebert et al. |
| 2003/0105854 A1 | 6/2003 | Thorsteinsson et al. |
| 2003/0113033 A1 | 6/2003 | Huang |
| 2003/0115334 A1 | 6/2003 | Bhat et al. |
| 2003/0115481 A1 | 6/2003 | Baird et al. |
| 2003/0120543 A1 | 6/2003 | Carey |
| 2003/0120586 A1 | 6/2003 | Litty |
| 2003/0140258 A1 | 7/2003 | Nelson et al. |
| 2003/0154214 A1 | 8/2003 | Tu et al. |
| 2003/0158751 A1 | 8/2003 | Suresh et al. |
| 2003/0163359 A1 | 8/2003 | Kanesaka |
| 2003/0163398 A1 | 8/2003 | Yoshioka et al. |
| 2003/0163413 A1 | 8/2003 | Wiczkowski |
| 2003/0172036 A1 | 9/2003 | Feigenbaum |
| 2003/0182551 A1 | 9/2003 | Frantz et al. |
| 2003/0208684 A1 | 11/2003 | Camacho et al. |
| 2003/0212618 A1 | 11/2003 | Keyes et al. |
| 2003/0233553 A1 | 12/2003 | Parks et al. |
| 2004/0001044 A1 | 1/2004 | Luciani et al. |
| 2004/0004733 A1 | 1/2004 | Barker et al. |
| 2004/0006553 A1 | 1/2004 | de Vries et al. |
| 2004/0010682 A1 | 1/2004 | Foster et al. |
| 2004/0027385 A1 | 2/2004 | Rekimoto et al. |
| 2004/0030912 A1 | 2/2004 | Merkle, Jr. et al. |
| 2004/0034652 A1 | 2/2004 | Hofmann et al. |
| 2004/0034794 A1 | 2/2004 | Mayer et al. |
| 2004/0073809 A1 | 4/2004 | Wing Keong |
| 2004/0088313 A1 | 5/2004 | Torres |
| 2004/0098618 A1 | 5/2004 | Kim et al. |
| 2004/0105431 A1 | 6/2004 | Monjas-Llorente et al. |
| 2004/0111621 A1 | 6/2004 | Himberger et al. |
| 2004/0117321 A1 | 6/2004 | Sancho |
| 2004/0139008 A1 | 7/2004 | Mascavaage, III |
| 2004/0153644 A1 | 8/2004 | McCorkendale et al. |
| 2004/0159699 A1 | 8/2004 | Nelson et al. |
| 2004/0166857 A1 | 8/2004 | Shim et al. |
| 2004/0171381 A1 | 9/2004 | Inselberg |
| 2004/0181598 A1 | 9/2004 | Paya et al. |
| 2004/0203750 A1 | 10/2004 | Cowdrey et al. |
| 2004/0230820 A1 | 11/2004 | Hui Hsu et al. |
| 2004/0236696 A1 | 11/2004 | Aoki et al. |
| 2004/0236702 A1 | 11/2004 | Fink et al. |
| 2004/0254890 A1 | 12/2004 | Sancho et al. |
| 2004/0260876 A1 | 12/2004 | Singh et al. |
| 2004/0260922 A1 | 12/2004 | Goodman et al. |
| 2005/0008148 A1 | 1/2005 | Jacobson |
| 2005/0015601 A1 | 1/2005 | Tabi |
| 2005/0022020 A1 | 1/2005 | Fremberg et al. |
| 2005/0033653 A1 | 2/2005 | Eisenberg et al. |
| 2005/0033703 A1 | 2/2005 | Holdsworth |
| 2005/0039034 A1 | 2/2005 | Doyle et al. |
| 2005/0039219 A1 | 2/2005 | Cooper et al. |
| 2005/0076230 A1 | 4/2005 | Redenbaugh et al. |
| 2005/0085931 A1 | 4/2005 | Willeby |
| 2005/0097320 A1 | 5/2005 | Golan et al. |
| 2005/0108177 A1 | 5/2005 | Sancho |
| 2005/0111054 A1 | 5/2005 | Umeda |

(56) References Cited

U.S. PATENT DOCUMENTS

| | | |
|---|---|---|
| 2005/0113092 A1 | 5/2005 | Coppinger et al. |
| 2005/0131826 A1 | 6/2005 | Cook |
| 2005/0185225 A1 | 8/2005 | Brawn et al. |
| 2005/0188423 A1 | 8/2005 | Motsinger et al. |
| 2005/0204159 A1 | 9/2005 | Davis et al. |
| 2005/0210533 A1 | 9/2005 | Copeland et al. |
| 2005/0246551 A1 | 11/2005 | Dondl et al. |
| 2005/0278542 A1 | 12/2005 | Pierson et al. |
| 2006/0008779 A1 | 1/2006 | Shand et al. |
| 2006/0010072 A1 | 1/2006 | Eisen |
| 2006/0026669 A1 | 2/2006 | Zakas |
| 2006/0031938 A1 | 2/2006 | Choi |
| 2006/0048211 A1 | 3/2006 | Pierson et al. |
| 2006/0064346 A1 | 3/2006 | Steenstra et al. |
| 2006/0069619 A1 | 3/2006 | Walker et al. |
| 2006/0075492 A1 | 4/2006 | Golan et al. |
| 2006/0080263 A1 | 4/2006 | Willis et al. |
| 2006/0126829 A1 | 6/2006 | Lai |
| 2006/0130132 A1 | 6/2006 | Dharmarajan |
| 2006/0136294 A1 | 6/2006 | Linden et al. |
| 2006/0155985 A1 | 7/2006 | Canard et al. |
| 2006/0161501 A1 | 7/2006 | Waserstein et al. |
| 2006/0190331 A1 | 8/2006 | Tollinger et al. |
| 2006/0190489 A1* | 8/2006 | Vohariwatt ......... G06K 9/00469 |
| 2006/0200855 A1 | 9/2006 | Willis |
| 2006/0200856 A1 | 9/2006 | Salowey et al. |
| 2006/0224898 A1 | 10/2006 | Ahmed |
| 2006/0237531 A1 | 10/2006 | Heffez et al. |
| 2006/0253327 A1 | 11/2006 | Morris et al. |
| 2006/0253328 A1 | 11/2006 | Kohli et al. |
| 2006/0264202 A1 | 11/2006 | Hagmeier et al. |
| 2006/0281541 A1 | 12/2006 | Nguyen et al. |
| 2006/0282660 A1 | 12/2006 | Varghese et al. |
| 2006/0284838 A1 | 12/2006 | Tsatalos et al. |
| 2006/0287902 A1 | 12/2006 | Helsper et al. |
| 2007/0011078 A1 | 1/2007 | Jain et al. |
| 2007/0030528 A1* | 2/2007 | Quaeler .................. G06F 17/24 358/453 |
| 2007/0038568 A1 | 2/2007 | Greene et al. |
| 2007/0043837 A1 | 2/2007 | Kruse et al. |
| 2007/0061211 A1 | 3/2007 | Ramer et al. |
| 2007/0061273 A1 | 3/2007 | Greene et al. |
| 2007/0073630 A1 | 3/2007 | Greene et al. |
| 2007/0094594 A1 | 4/2007 | Matichuk et al. |
| 2007/0097076 A1 | 5/2007 | Gross |
| 2007/0097976 A1 | 5/2007 | Wood et al. |
| 2007/0101405 A1 | 5/2007 | Engle et al. |
| 2007/0107059 A1 | 5/2007 | Chasin et al. |
| 2007/0118892 A1 | 5/2007 | Sastry et al. |
| 2007/0124246 A1 | 5/2007 | Lawyer et al. |
| 2007/0162763 A1 | 7/2007 | Bender et al. |
| 2007/0183000 A1 | 8/2007 | Eisen et al. |
| 2007/0198410 A1 | 8/2007 | Labgold et al. |
| 2007/0199054 A1 | 8/2007 | Florencio et al. |
| 2007/0204044 A1 | 8/2007 | Rice et al. |
| 2007/0214151 A1 | 9/2007 | Scott et al. |
| 2007/0220594 A1 | 9/2007 | Tulsyan |
| 2007/0233599 A1 | 10/2007 | Ganesan et al. |
| 2007/0234070 A1 | 10/2007 | Horning et al. |
| 2007/0239604 A1 | 10/2007 | O'Connell et al. |
| 2007/0255821 A1 | 11/2007 | Ge et al. |
| 2007/0266257 A1 | 11/2007 | Camaisa et al. |
| 2007/0271466 A1 | 11/2007 | Mak |
| 2007/0294401 A1 | 12/2007 | Shkedi |
| 2008/0002725 A1 | 1/2008 | Alicherry et al. |
| 2008/0002911 A1 | 1/2008 | Eisen et al. |
| 2008/0005394 A1 | 1/2008 | Crooks |
| 2008/0010367 A1 | 1/2008 | Cheng et al. |
| 2008/0010678 A1 | 1/2008 | Burdette et al. |
| 2008/0015988 A1 | 1/2008 | Brown et al. |
| 2008/0021801 A1 | 1/2008 | Song et al. |
| 2008/0040653 A1 | 2/2008 | Levine |
| 2008/0040802 A1 | 2/2008 | Pierson et al. |
| 2008/0046562 A1 | 2/2008 | Butler |
| 2008/0052629 A1 | 2/2008 | Phillips et al. |
| 2008/0098222 A1 | 4/2008 | Zilberman |
| 2008/0101277 A1 | 5/2008 | Taylor |
| 2008/0104070 A1 | 5/2008 | Lonchar |
| 2008/0104672 A1 | 5/2008 | Lunde et al. |
| 2008/0104684 A1 | 5/2008 | Lunde et al. |
| 2008/0120195 A1 | 5/2008 | Shakkarwar |
| 2008/0120214 A1 | 5/2008 | Steele et al. |
| 2008/0133420 A1 | 6/2008 | Barber |
| 2008/0162200 A1 | 7/2008 | O'Sullivan et al. |
| 2008/0162202 A1 | 7/2008 | Khanna et al. |
| 2008/0162475 A1 | 7/2008 | Meggs |
| 2008/0163128 A1 | 7/2008 | Callanan et al. |
| 2008/0174603 A1 | 7/2008 | Brass et al. |
| 2008/0184355 A1 | 7/2008 | Walrath et al. |
| 2008/0184372 A1 | 7/2008 | Hoshina |
| 2008/0189790 A1 | 8/2008 | Park |
| 2008/0191007 A1 | 8/2008 | Keay |
| 2008/0201214 A1 | 8/2008 | Aaron |
| 2008/0204788 A1 | 8/2008 | Kelly et al. |
| 2008/0222706 A1 | 9/2008 | Renaud et al. |
| 2008/0235623 A1 | 9/2008 | Li |
| 2008/0239365 A1* | 10/2008 | Salgado ................ G06F 17/212 358/1.15 |
| 2008/0249820 A1 | 10/2008 | Pathria et al. |
| 2008/0281606 A1 | 11/2008 | Kitts |
| 2008/0281941 A1 | 11/2008 | Park et al. |
| 2008/0288299 A1 | 11/2008 | Schultz |
| 2008/0301281 A1 | 12/2008 | Wang et al. |
| 2008/0306830 A1 | 12/2008 | Lasa et al. |
| 2008/0313079 A1 | 12/2008 | Van Bosch et al. |
| 2008/0319774 A1 | 12/2008 | O'Sullivan et al. |
| 2008/0319841 A1 | 12/2008 | Oliver et al. |
| 2009/0018940 A1 | 1/2009 | Wang et al. |
| 2009/0024971 A1 | 1/2009 | Willner et al. |
| 2009/0044279 A1 | 2/2009 | Crawford et al. |
| 2009/0044282 A1 | 2/2009 | Govindaraju |
| 2009/0055398 A1 | 2/2009 | Zhu et al. |
| 2009/0070664 A1* | 3/2009 | Gavin .................... G06F 17/241 715/234 |
| 2009/0089869 A1 | 4/2009 | Varghese |
| 2009/0106413 A1 | 4/2009 | Salo |
| 2009/0138590 A1 | 5/2009 | Lee et al. |
| 2009/0157417 A1 | 6/2009 | Bradley et al. |
| 2009/0164269 A1 | 6/2009 | Gupta et al. |
| 2009/0177692 A1 | 7/2009 | Chagoly et al. |
| 2009/0183010 A1 | 7/2009 | Schnell et al. |
| 2009/0205031 A1 | 8/2009 | Sato et al. |
| 2009/0222308 A1 | 9/2009 | Zoldi et al. |
| 2009/0228585 A1 | 9/2009 | Kosbab et al. |
| 2009/0234738 A1 | 9/2009 | Britton et al. |
| 2009/0241174 A1 | 9/2009 | Rajan et al. |
| 2009/0260064 A1 | 10/2009 | Mcdowell et al. |
| 2009/0265773 A1 | 10/2009 | Schultz |
| 2009/0271306 A1 | 10/2009 | Pierson |
| 2009/0307141 A1 | 10/2009 | Kongalath et al. |
| 2009/0280777 A1 | 11/2009 | Doherty |
| 2009/0292568 A1 | 11/2009 | Khosravani et al. |
| 2009/0293128 A1 | 11/2009 | Lippmann et al. |
| 2009/0296907 A1 | 12/2009 | Vendrow et al. |
| 2009/0298480 A1 | 12/2009 | Khambete et al. |
| 2009/0307119 A1 | 12/2009 | Ahles et al. |
| 2009/0313134 A1 | 12/2009 | Faith et al. |
| 2010/0005013 A1 | 1/2010 | Uriarte |
| 2010/0030641 A1 | 2/2010 | Ibenforth |
| 2010/0030777 A1 | 2/2010 | Panwar et al. |
| 2010/0057623 A1 | 3/2010 | Kapur et al. |
| 2010/0070606 A1 | 3/2010 | Shenfield et al. |
| 2010/0082972 A1 | 4/2010 | Benco et al. |
| 2010/0094767 A1 | 4/2010 | Miltonberger |
| 2010/0094768 A1 | 4/2010 | Miltonberger |
| 2010/0106611 A1 | 4/2010 | Paulsen et al. |
| 2010/0107225 A1 | 4/2010 | Spencer et al. |
| 2010/0121716 A1 | 5/2010 | Golan |
| 2010/0138299 A1 | 6/2010 | Preston et al. |
| 2010/0145960 A1 | 6/2010 | Casteel et al. |
| 2010/0153540 A1 | 6/2010 | Li et al. |
| 2010/0157848 A1 | 6/2010 | Das et al. |
| 2010/0161424 A1 | 6/2010 | Sylvain |
| 2010/0161566 A1 | 6/2010 | Adair et al. |

(56) References Cited

U.S. PATENT DOCUMENTS

| | | |
|---|---|---|
| 2010/0169157 A1 | 7/2010 | Muhonen et al. |
| 2010/0169192 A1 | 7/2010 | Zoldi et al. |
| 2010/0192082 A1 | 7/2010 | Sodah |
| 2010/0199332 A1 | 8/2010 | Bachmann et al. |
| 2010/0199338 A1 | 8/2010 | Craddock et al. |
| 2010/0211464 A1 | 8/2010 | Zhu et al. |
| 2010/0223105 A1 | 9/2010 | Gassewitz et al. |
| 2010/0223145 A1 | 9/2010 | Dragt |
| 2010/0228625 A1 | 9/2010 | Priyadarshan et al. |
| 2010/0228638 A1 | 9/2010 | Mikan et al. |
| 2010/0257065 A1 | 10/2010 | Gupta et al. |
| 2010/0274678 A1 | 10/2010 | Rolf et al. |
| 2010/0293094 A1 | 11/2010 | Kolkowitz et al. |
| 2010/0306827 A1 | 12/2010 | Esteve Balducci et al. |
| 2010/0321296 A1 | 12/2010 | Gross |
| 2010/0333170 A1 | 12/2010 | Cox et al. |
| 2011/0022483 A1 | 1/2011 | Hammad |
| 2011/0022517 A1 | 1/2011 | Hammad |
| 2011/0035302 A1 | 2/2011 | Martell et al. |
| 2011/0047072 A1 | 2/2011 | Ciurea |
| 2011/0082768 A1 | 4/2011 | Eisen |
| 2011/0112901 A1 | 5/2011 | Fried et al. |
| 2011/0161228 A1 | 6/2011 | Suzuki et al. |
| 2011/0173281 A1 | 7/2011 | Smith |
| 2011/0184778 A1 | 7/2011 | Graepel et al. |
| 2011/0194679 A1 | 8/2011 | Patisaul et al. |
| 2011/0218860 A1 | 9/2011 | Barber |
| 2011/0225091 A1 | 9/2011 | Plastina et al. |
| 2011/0238575 A1 | 9/2011 | Nightengale et al. |
| 2011/0251951 A1 | 10/2011 | Kolkowitz et al. |
| 2011/0258118 A1 | 10/2011 | Ciurea |
| 2011/0264612 A1 | 10/2011 | Ryman-Tubb et al. |
| 2011/0282778 A1 | 11/2011 | Wright et al. |
| 2011/0288932 A1 | 11/2011 | Marks et al. |
| 2011/0302087 A1 | 12/2011 | Crooks |
| 2011/0302096 A1 | 12/2011 | Lowry |
| 2011/0307341 A1 | 12/2011 | Zohar et al. |
| 2011/0314557 A1 | 12/2011 | Marshall |
| 2012/0022883 A1 | 1/2012 | Morrison |
| 2012/0030083 A1 | 2/2012 | Newman et al. |
| 2012/0030757 A1 | 2/2012 | Baikalov et al. |
| 2012/0030771 A1 | 2/2012 | Pierson et al. |
| 2012/0036042 A1 | 2/2012 | Graylin et al. |
| 2012/0041841 A1 | 2/2012 | Hu et al. |
| 2012/0054136 A1 | 3/2012 | Maulik |
| 2012/0054847 A1 | 3/2012 | Schultz et al. |
| 2012/0084203 A1 | 4/2012 | Mehew et al. |
| 2012/0084860 A1 | 4/2012 | Cao et al. |
| 2012/0094639 A1 | 4/2012 | Carlson et al. |
| 2012/0101939 A1 | 4/2012 | Kasower |
| 2012/0150742 A1 | 6/2012 | Poon et al. |
| 2012/0150750 A1 | 6/2012 | Law et al. |
| 2012/0157062 A1 | 6/2012 | Kim et al. |
| 2012/0158586 A1 | 6/2012 | Ganti et al. |
| 2012/0166533 A1 | 6/2012 | Rubinstein et al. |
| 2012/0173465 A1 | 7/2012 | Hore et al. |
| 2012/0179558 A1 | 7/2012 | Fischer |
| 2012/0197981 A1 | 8/2012 | Chan |
| 2012/0204262 A1 | 8/2012 | Thomas et al. |
| 2012/0215896 A1 | 8/2012 | Johannsen |
| 2012/0216282 A1 | 8/2012 | Pappu et al. |
| 2012/0221470 A1 | 8/2012 | Lyon |
| 2012/0222111 A1 | 8/2012 | Oliver et al. |
| 2012/0233665 A1 | 9/2012 | Ranganathan et al. |
| 2012/0239553 A1 | 9/2012 | Gonen et al. |
| 2012/0239574 A1 | 9/2012 | Smith et al. |
| 2012/0239774 A1 | 9/2012 | Tola et al. |
| 2012/0278127 A1 | 11/2012 | Kirakosyan et al. |
| 2012/0295580 A1 | 11/2012 | Corner |
| 2012/0297380 A1 | 11/2012 | Colbert et al. |
| 2012/0311162 A1 | 12/2012 | Paulsen et al. |
| 2012/0323788 A1 | 12/2012 | Keresman et al. |
| 2012/0323836 A1 | 12/2012 | Wright et al. |
| 2012/0330787 A1 | 12/2012 | Hanson et al. |
| 2013/0006743 A1 | 1/2013 | Moore et al. |
| 2013/0018789 A1 | 1/2013 | Kaufmann |
| 2013/0018791 A1 | 1/2013 | Mendicino et al. |
| 2013/0024300 A1 | 1/2013 | Choudhuri et al. |
| 2013/0036304 A1 | 2/2013 | Lin et al. |
| 2013/0040603 A1 | 2/2013 | Stahlberg et al. |
| 2013/0042298 A1 | 2/2013 | Plaza Fonseca et al. |
| 2013/0055388 A1 | 2/2013 | Thomas et al. |
| 2013/0073463 A1 | 3/2013 | Dimmick et al. |
| 2013/0073473 A1 | 3/2013 | Heath |
| 2013/0085841 A1 | 4/2013 | Singleton et al. |
| 2013/0097673 A1 | 4/2013 | Meehan et al. |
| 2013/0097701 A1 | 4/2013 | Moyle et al. |
| 2013/0103482 A1 | 4/2013 | Song et al. |
| 2013/0103629 A1 | 4/2013 | Vaiciulis et al. |
| 2013/0110637 A1 | 5/2013 | Bott |
| 2013/0111592 A1 | 5/2013 | Zhu et al. |
| 2013/0117832 A1 | 5/2013 | Gandhi |
| 2013/0144539 A1 | 6/2013 | Allen et al. |
| 2013/0148525 A1 | 6/2013 | Cuadra Sanchez et al. |
| 2013/0159195 A1 | 6/2013 | Kirillin et al. |
| 2013/0185764 A1 | 7/2013 | Krstić et al. |
| 2013/0197998 A1 | 8/2013 | Buhrmann et al. |
| 2013/0198066 A1 | 8/2013 | Wall et al. |
| 2013/0226717 A1 | 8/2013 | Ahluwalia et al. |
| 2013/0273879 A1 | 10/2013 | Eisen et al. |
| 2013/0339186 A1 | 12/2013 | French |
| 2014/0032902 A1 | 1/2014 | Agrawal et al. |
| 2014/0114821 A1 | 4/2014 | Yoshioka et al. |
| 2014/0120864 A1 | 5/2014 | Manolarakis et al. |
| 2014/0122343 A1 | 5/2014 | Einav et al. |
| 2014/0258125 A1 | 9/2014 | Gerber et al. |
| 2014/0289867 A1 | 9/2014 | Bukai |
| 2014/0361926 A1 | 12/2014 | Eisen et al. |
| 2015/0026027 A1 | 1/2015 | Priess et al. |
| 2015/0046989 A1 | 2/2015 | Oberheide et al. |
| 2015/0106270 A1 | 4/2015 | Burrell et al. |
| 2015/0127825 A1 | 5/2015 | Johannsen |
| 2015/0186901 A1 | 7/2015 | Miltonberger |
| 2015/0188897 A1 | 7/2015 | Grigorovici et al. |
| 2015/0193769 A1 | 7/2015 | Barber |
| 2015/0193821 A1 | 7/2015 | Izumori et al. |
| 2015/0242861 A9 | 8/2015 | Baldassano |
| 2015/0254658 A1 | 9/2015 | Bondesen et al. |
| 2015/0294316 A1 | 10/2015 | Eisen |
| 2015/0350856 A1 | 12/2015 | Circosta et al. |
| 2016/0019546 A1 | 1/2016 | Eisen |
| 2016/0021084 A1 | 1/2016 | Eisen |
| 2016/0034954 A1 | 2/2016 | Tollinger et al. |
| 2016/0125461 A1 | 5/2016 | Sivaramakrishnan et al. |
| 2016/0203487 A1 | 7/2016 | Eisen |
| 2016/0246581 A1 | 8/2016 | Jimenez et al. |
| 2016/0321701 A1 | 11/2016 | Tollinger et al. |
| 2016/0328710 A1 | 11/2016 | Britton et al. |
| 2017/0039571 A1 | 2/2017 | Eisen |
| 2017/0142106 A1 | 5/2017 | Eisen et al. |
| 2018/0108029 A1 | 4/2018 | Sinha et al. |
| 2018/0121915 A1 | 5/2018 | Britton et al. |
| 2018/0262478 A1 | 9/2018 | Eisen |
| 2018/0322500 A1 | 11/2018 | Eisen |
| 2019/0028472 A1 | 1/2019 | Eisen |
| 2019/0066192 A1 | 2/2019 | Eisen |
| 2019/0356659 A1 | 11/2019 | Eisen et al. |

FOREIGN PATENT DOCUMENTS

| | | |
|---|---|---|
| EP | 0 923 039 | 6/1999 |
| EP | 1 067 792 | 1/2001 |
| EP | 1 209 935 | 5/2002 |
| EP | 1 256 911 | 11/2002 |
| EP | 1 201 070 B1 | 6/2006 |
| EP | 1 703 382 | 9/2006 |
| EP | 1 197 032 B1 | 8/2007 |
| EP | 2 154 891 | 2/2010 |
| GB | 2 491 101 | 11/2012 |
| GB | 2 492 604 | 1/2013 |
| JP | 05-257602 | 10/1993 |
| JP | 2000-020467 | 1/2000 |
| JP | 2000-099250 | 4/2000 |
| JP | 2000-137755 | 5/2000 |

(56) References Cited

FOREIGN PATENT DOCUMENTS

| | | |
|---|---|---|
| JP | 2000-242582 | 9/2000 |
| JP | 2000-276281 | 10/2000 |
| JP | 2002-007697 | 1/2002 |
| JP | 2002-297869 | 10/2002 |
| JP | 2003-050910 | 2/2003 |
| JP | 2005-063216 | 3/2005 |
| JP | 2005-115644 | 4/2005 |
| JP | 2005-135431 | 5/2005 |
| JP | 2006-004333 | 1/2006 |
| JP | 2007-272520 | 10/2007 |
| JP | 2007-282249 | 10/2007 |
| JP | 2008-022298 | 1/2008 |
| JP | 2008-065363 | 3/2008 |
| JP | 2008-171315 | 7/2008 |
| JP | 2008-535124 | 8/2008 |
| JP | 2008-243008 | 10/2008 |
| JP | 2008-257434 | 10/2008 |
| JP | 2008-269229 | 11/2008 |
| JP | 2009-048538 | 3/2009 |
| JP | 2009-122880 | 6/2009 |
| JP | 2009-175984 | 8/2009 |
| JP | 2010-020728 | 1/2010 |
| JP | 2010-061254 | 3/2010 |
| JP | 2010-122955 | 6/2010 |
| JP | 2010-122956 | 6/2010 |
| JP | 2010-225040 | 10/2010 |
| JP | 2010-250664 | 11/2010 |
| JP | 2011-065531 | 3/2011 |
| JP | 2011-134252 | 7/2011 |
| JP | 2011-159307 | 8/2011 |
| JP | 2012-234503 | 11/2012 |
| JP | 5216932 | 6/2013 |
| KR | 10-1999-0015738 | 3/1999 |
| KR | 10-0645983 | 11/2006 |
| KR | 10-2008-0044558 | 5/2008 |
| KR | 10-2009-0051977 | 9/2009 |
| KR | 10-2010-0085888 | 7/2010 |
| WO | WO 96/041488 | 12/1996 |
| WO | WO 97/003410 | 1/1997 |
| WO | WO 99/050775 | 10/1999 |
| WO | WO 01/011450 | 2/2001 |
| WO | WO 01/033520 | 5/2001 |
| WO | WO 01/095550 | 12/2001 |
| WO | WO 01/097134 | 12/2001 |
| WO | WO 02/001462 | 1/2002 |
| WO | WO 02/071176 | 9/2002 |
| WO | WO 02/091226 | 11/2002 |
| WO | WO 03/017155 | 2/2003 |
| WO | WO 03/025868 | 3/2003 |
| WO | WO 03/075197 A2 | 9/2003 |
| WO | WO 03/075197 A3 | 12/2003 |
| WO | WO 02/037219 A9 | 5/2004 |
| WO | WO 2004/038997 | 5/2004 |
| WO | WO 2005/038818 | 4/2005 |
| WO | WO 2005/099166 | 10/2005 |
| WO | WO 2006/135367 | 12/2006 |
| WO | WO 2007/001394 | 1/2007 |
| WO | WO 2007/045818 | 4/2007 |
| WO | WO 2007/072238 | 6/2007 |
| WO | WO 2007/075573 | 7/2007 |
| WO | WO 2008/029828 | 3/2008 |
| WO | WO 2008/054849 | 5/2008 |
| WO | WO 2009/132148 | 10/2009 |
| WO | WO 2012/054646 | 4/2012 |
| WO | WO 2012/061801 | 5/2012 |
| WO | WO 2012/142121 | 10/2012 |
| WO | WO 2012/142584 | 10/2012 |
| WO | WO 2013/006538 | 1/2013 |
| WO | WO 2013/142722 | 9/2013 |
| WO | WO 2014/022813 | 2/2014 |
| WO | WO 2014/078569 | 5/2014 |

OTHER PUBLICATIONS

Banking Services Newsletter, "Keeping You Up-to-Date on Banking Developments Throughout the UC System", University of California, Office of the President, Banking Services Group, Newsletter 1, Dec. 2005, p. 1.
Bharosa, "Bharosa Authenticator", http://www.bharosa.com/authenticator.html, Jan. 18, 2007, pp. 3.
Bharosa, "Bharosa Announces Online Authentication Solution to Counter Check 21-Based Fraud", http://www.bharosa.com/news/PR-110705.html, Jan. 18, 2007, pp. 2.
Darlin, Damon, "Opening the Door on the Credit Report and Throwing Away the Lock", http://www.nytimes.com/2006/03/18/business/yourmoney/18money.html, The New York Times, Saturday Mar. 18, 2006, pp. 2.
Derfler, Jr. et al, "How Networks Work", Millennium Edition, Que Corporation, Indianapolis, IN, Sep. 2000, pp. 230.
Gralla, Preston, "How the Internet Works", Millennium Edition, Que Corporation, Indianapolis, IN, Aug. 1999, pp. 329.
Gueye et al., "Constraint-Based Geolocation of Internet Hosts", ACM Internet Measurement Conference 2004, Oct. 25-27, 2004, Taormina, Sicily, Italy, vol. 14, No. 6, pp. 288-293.
"ISO 8583", Wikipedia, http://en.wikipedia.org/wiki/ISO_8583, dated Apr. 13, 2015 in 14 pages.
Kohno et al., "Remote Physical Device Fingerprinting", Proceedings of 2005 IEEE Symposium on Security and Privacy, May 8-11, 2005, Oakland, CA, pp. 211-225.
Manavoglu et al., "Probabilistic User Behavior Models", ICDM, Third IEEE International Conference on Data Mining, Nov. 19-22, 2003, pp. 203-210.
TechWeb, "Wells Fargo Intros Anti-Theft Alerts", http://www.techweb.com/wire/166404177, Aug. 1, 2005, pp. 1.
"UPIC Marketing Guide—The Clearing House", http://www.upic.com/infofiles/UPIC_Marketing_Guide.pdf, as printed Dec. 19, 2006. pp. 1-16.
White, Ron, "How Computers Work", Millennium Edition, Que Corporation, Indianapolis, IN, Sep. 1999, pp. 284.
Official Communication in European Patent Application No. 05818903.6, dated Dec. 23, 2011.
Official Communication in European Patent Application No. 05818903.6, dated Mar. 18, 2014.
International Search Report and Written Opinion for Application No. PCT/US2005/035532, dated Oct. 29, 2007.
International Preliminary Report on Patentability and Written Opinion for Application No. PCT/US2005/035532, dated Jan. 9, 2008.
Official Communication in European Patent Application No. 6845722.5, dated Mar. 13, 2009.
Official Communication in European Patent Application No. 8159110.9), dated Oct. 27, 2008.
Official Communication in European Patent Application No. 8159110.9, dated Mar. 22, 2010.
International Search Report and Written Opinion for Application No. PCT/US2006/048251, dated Feb. 26, 2008.
International Preliminary Report on Patentability and Written Opinion for Application No. PCT/US2006/048251, dated Jun. 18, 2008.
International Search Report and Written Opinion for Application No. PCT/US2007/065776, dated Jul. 3, 2008.
International Preliminary Report on Patentability and Written Opinion for Application No. PCT/US2007/065776, dated Sep. 30, 2008.
International Search Report and Written Opinion received in PCT Application No. PCT/US2005/020750, dated Jun. 13, 2008.
International Preliminary Report on Patentability and Written Opinion received in PCT Application No. PCT/US2005/020750, dated Jul. 1, 2008.
Official Communication in European Patent Application No. 08165224.0, dated Nov. 15, 2010.
Supplementary European Search Report for Application No. EP09735653, dated Dec. 16, 2011.

(56) References Cited

OTHER PUBLICATIONS

Official Communication for Application No. EP09735653, dated Jan. 4, 2013.
International Search Report and Written Opinion for Application No. PCT/US2009/041462, dated Dec. 1, 2009.
International Preliminary Report on Patentability and Written Opinion for Application No. PCT/US2009/041462, dated Nov. 4, 2010.
International Search Report and Written Opinion for Application No. PCT/US2011/056948, dated Apr. 18, 2012.
International Preliminary Report on Patentability in Application No. PCT/US2011/056948, dated May 2, 2013.
International Search Report and Written Opinion for Application No. PCT/US2013/033357, dated Jul. 10, 2013.
International Preliminary Report on Patentability in Application No. PCT/US2013/033357, dated Sep. 23, 2014.
International Search Report and Written Opinion for Application No. PCT/US2013/053495, dated Nov. 22, 2013.
International Preliminary Report on Patentability in Application No. PCT/US2013/053495, dated Feb. 3, 2015.
International Search Report and Written Opinion for Application No. PCT/US2013/070146, dated Mar. 3, 2014.
International Preliminary Report on Patentability in Application No. PCT/US2013/070146, dated May 19, 2015.
Provisional Application as filed in U.S. Appl. No. 61/324,312, dated Apr. 15, 2010 in 15 pages.
Summons to Attend Oral Proceedings received in European Application No. EP09735653, dated Oct. 7, 2016.
The Knightmare, "Secrets of a Super Hacker", Loompanics Unlimited, Port Townsend, Washington, 1994, pp. 233.
Official Communication in European Patent Application No. 19181057.1, dated Sep. 17, 2019.

* cited by examiner

Jane Doe
101 Anydrive
Hometown, IN 46278

5600

FRN (Fractional Routing Number) → 12-345/678 -OR- 12-3456/789

PAY TO THE
ORDER OF

DATE $

DOLLARS

SIGNATURE 123456789 123456789101112 5600

*FIG. 5*

Jane Doe
101 Anydrive
Hometown, IN 46278

5600

FRN (Fractional Routing Number) → 12-345/678 -OR- 12-3456/789

PAY TO THE
ORDER OF

DATE $

DOLLARS

SIGNATURE 123456789 123456789101112 5600

METHODS AND APPARATUS FOR SECURELY DISPLAYING DIGITAL IMAGES

This application is a continuation application of U.S. patent application Ser. No. 14/580,085, filed on Dec. 22, 2014, which is a continuation of U.S. patent application Ser. No. 11/769,674, filed on Jun. 27, 2007, which is a continuation-in-part application of U.S. patent application Ser. No. 11/612,425 filed on Dec. 18, 2006, now U.S. Pat. No. 8,612,854, which claims the benefit of priority to U.S. Provisional Patent Application Ser. No. 60/751,188 filed on Dec. 16, 2005, wherein each are incorporated herein by reference in their entirety.

FIELD OF THE INVENTION

The invention relates to securely displaying digital images of documents containing selected or confidential information. More particularly, the invention relates to methods and apparatus for altering or redacting digital images of documents for viewing such as personal checks in order to secure sensitive information.

BACKGROUND

Converting a paper hardcopy document into a digital image may be desirable due to the ease with which it can be transmitted and processed by a computer system. For example, images of documents can be scanned and transmitted via e-mail or shared on the Internet using a variety of known protocols such as HTTP or FTP. Obtaining a digital image of a document may also be advantageous so that it can be manipulated or edited on a computer system. Electronic transmissions of digital images are frequently preferred over traditional postal methods due to speed of delivery and the ever increasing number of computer systems and our reliance thereon.

The U.S. Congress recognized the advantages of using digital versions of checks over paper versions thereof by passing the Check 21 Act enacted in 2003. The Check 21 Act allows a financial institution to create a digital version of a processed check and make it accessible online to the payer of the check, thereby eliminating the need for further handling or return of the paper check. This computerized process greatly reduces the time and costs associated with the processing of paper checks, and hence enhances the efficiency of our banking system. It abo provides an easy and convenient alternative for bank customers to monitor and manage banking related documents and activities. Online checking offered by many financial institutions such as Bank of America and Wells Fargo allows customers to conveniently view digital images of their cashed checks.

However digital images of documents may often contain personal or sensitive information that a customer or a user may wish to conceal. The term "sensitive information" may include anything designated by a party that should be secured for viewing online such as a customer's name, address or telephone number in conjunction with the customer's social security number, driver's license, or account number (FDIC FIL-27 2005).

At the same time, images must also reveal or contain sufficient information that is legible or usable to the user. For example, banks and other kinds of financial institutions allow a user to access an online bank account and view a digital image of a processed check or financial document. But sensitive information such as the customer's name, bank account number, routing number, address, telephone number, signature and other personal information, may appear on a computer screen while viewing a digital version of the check. The security of such personalized or sensitive information is compromised when it is displayed. The customer or user may therefore wish to hide or secure such personalized information from computer hackers, identity thieves, or even from viewers with no ill intentions.

A variety of graphics editing programs are available today such as Adobe Photoshop that allows a digital image to be edited or altered manually. Original versions of an image may be created and saved as a new image. When using such software programs, a user often manually edits the personalized or sensitive content of the individual digital image with an editing tool such as a blur tool included with the software. Meanwhile, banks and other financial institutions usually process large quantities of checks and/or documents containing personalized or sensitive information. A financial institution may have numerous customers, each with an online bank account on which they can view digital versions of a processed or cashed check. The digital image may be conveniently displayed to a customer while at the same time the financial institution can avoid having to mail or return the processed check to the customer. The ability to efficiently process a large number of checks while protecting personal information contained therein presents significant challenges in online security and the prevention of fraud of theft.

A need therefore exists to secure and protect personalized or sensitive information within digital images of documents. It would be further advantageous to protect available information online without having to manually and singularly edit or alter the contents of the digital images.

SUMMARY OF THE INVENTION

The invention provides methods and apparatus for securing selected information contained within digital images of documents. Various aspects of the invention described herein may be applied to any of the particular applications set forth below or for any other types of information that is displayed for viewing. The invention may be applied as a standalone tool or as part of an integrated software solution against online fraud and identify theft. The invention can be optionally integrated into existing business processes seamlessly. It shall be understood that different aspects of the invention can be appreciated individually, collectively or in combination with each other.

A preferable embodiment of the invention provides image masking systems and methods for providing online banking customers with necessary or shared information online without exposing sensitive data to potential fraud. Such image masking can be performed real-time or on-the-fly to a presented image only without necessarily altering an originally scanned document. An originally scanned image can be remain intact and unaltered, in a preferably embodiment, while a new revised or redacted digital image can be created. All of the image information for redacted digital images provided herein may be transmitted for viewing, or alternatively, sanitized versions of a scanned document with just some of the image information may be sent instead to display non-sensitive portions of an original document. The modified or redacted digital images provided in accordance with the invention offer customers access to pictorial or graphical images of corresponding paper documents without compromising account or personal identity information that should be kept secured. Such information can be blurred by various digital editing techniques such as blurring or pixelating or shading, or alternatively, sections of the digital image containing sensitive information may not be transmitted at all.

Accordingly, the invention can provide numerous advantages over other available and complicated document security solutions by protecting sensitive customer data from fraud and identify theft without involving customer education, adoption or enrollment. No enrollment process or change of behavior is required on the part of customers. The security processes provided in accordance with the invention can be performed on the back end, invisible to users which can thereby enhance their sense of security without adding inconvenience or latency to the online experience (automated backend security). While the masked images of secured documents herein may be helpful for daily use, customers can still request to view and access an unredacted version of a document when appropriate security measures are in place for additional authentication. Further password information may be requested, challenge questions may be presented calling for valid responses, one-time tokens or other strong authentication protocol may be employed.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

The novel features of the invention are set forth with particularity in the appended claims. A better understanding of the features and advantages of the invention will be obtained by reference to the following detailed description that sets forth illustrative embodiments, in which the principles of the invention are utilized:

FIGS. 5-8 describe another embodiment of the invention that converts a first digital image of a document such as a check into a second redacted digital image containing selectively pixelated image cells that can be securely displayed.

DETAILED DESCRIPTION OF THE INVENTION

The invention is directed to methods and apparatus for modifying or altering digital images of documents in order to secure selected information contained therein. The selected information may include personalized or sensitive information or any content which can be redacted or hidden from view in accordance with the invention. The selected information may be hidden in an altered digital image so it can be secured from view. Another aspect of the invention provides high throughput automated processes and apparatus for securing or altering of digital images of hardcopies of documents. The invention further provides computer systems and software programs that include instructions to carry out or perform various steps of such methods.

Figure 1:
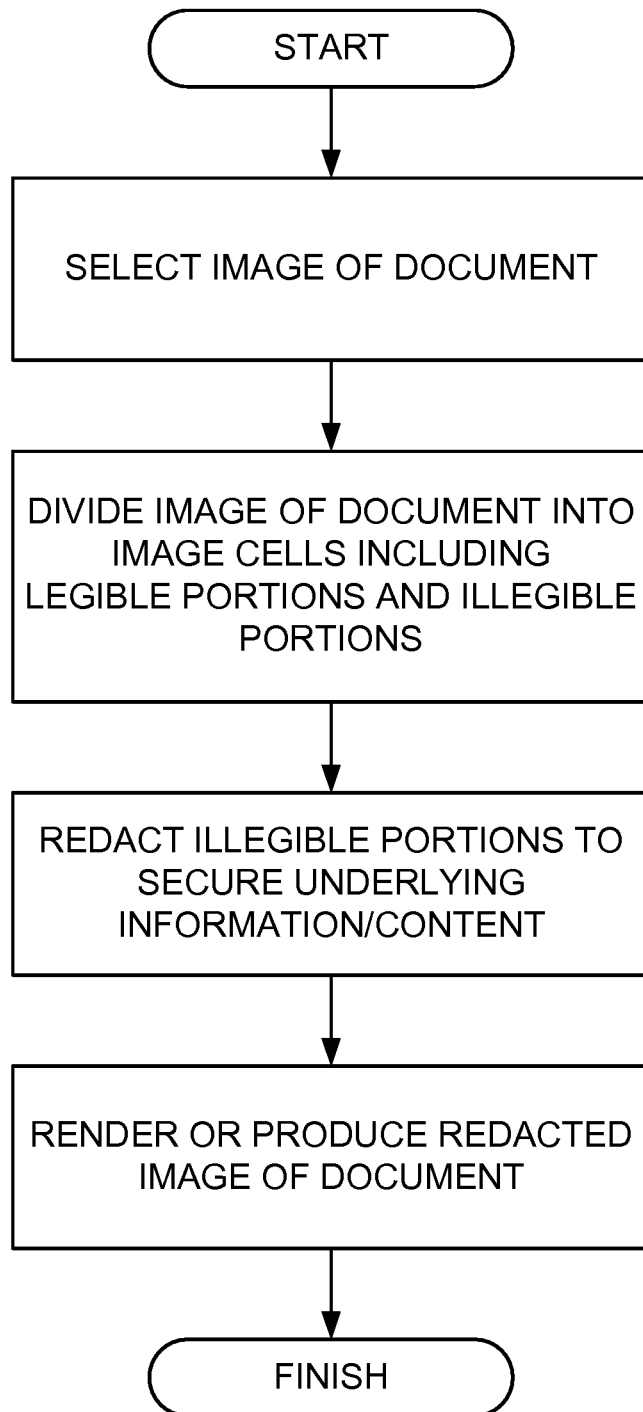
FIG. 1 describes methods of securing personalized or sensitive information displayed within a digital image of a document.

FIG. 1 describes an aspect of the invention that provides methods for securing selected information contained within a digital image. The digital image to be displayed may be derived from a scanned paper hardcopy document or any computer generated illustration that contains personalized or sensitive information or content. Upon selection of the digital image, it can be divided into a plurality of image cells that can be characterized or designated as either legible portions or illegible portions of the document or image. The legible portions of the image may present non-sensitive or non-personal information that a user may wish to display. The illegible portions of the image may however include sensitive, financial or personal information that should not be displayed. The image cells corresponding to illegible portions of the image may be redacted to hide or obscure the underlying information contained in the image. Meanwhile, the image cells corresponding to legible portions of the image can remain unredacted and visible so as to reveal content or images located therein. The resulting redacted or altered digital image can be useful in many respects and communicate sufficient context or information but not so far as to compromise or unnecessarily reveal sensitive information. Accordingly, the redacted image of the document can be rendered or available for display online in a controlled and secure manner.

A preferable embodiment of the invention provides a method of securely displaying digital images of banking related documents. The method comprises selecting a first digital image of a banking related document containing personalized content, dividing the first digital image into a plurality of image cells, and then redacting at least one of the image cells to provide a second digital image wherein the personalized content in the banking related document is illegible (see FIGS. 2-4). This methodology can be applied to a variety of digital images corresponding to checks (personal or business check images) from financial institutions or any hardcopy document outside of banking transactions. Other preferable embodiments of the invention can be directed to documents or digital images thereof such as deposit slips, bank statements, brokerage statements, legal documents, credit card bills, as well as tax documents or returns, driver's licenses, medical records or any other document containing personalized or sensitive information that a user may wish to hide or conceal from view on a computer or online. It shall be understood that the personalized or sensitive information need not be in the form of text, but may be rather a graphical image such as an illustration of an individual, fingerprint or biometric information. The documents secured in accordance with this aspect of the invention can originally exist as a paper hardcopy that can be scanned to create digital images, or the documents may be stored as digital images in computer readable memory such as a computer hard drives, flash memory drives or other memory media.

Figure 2:
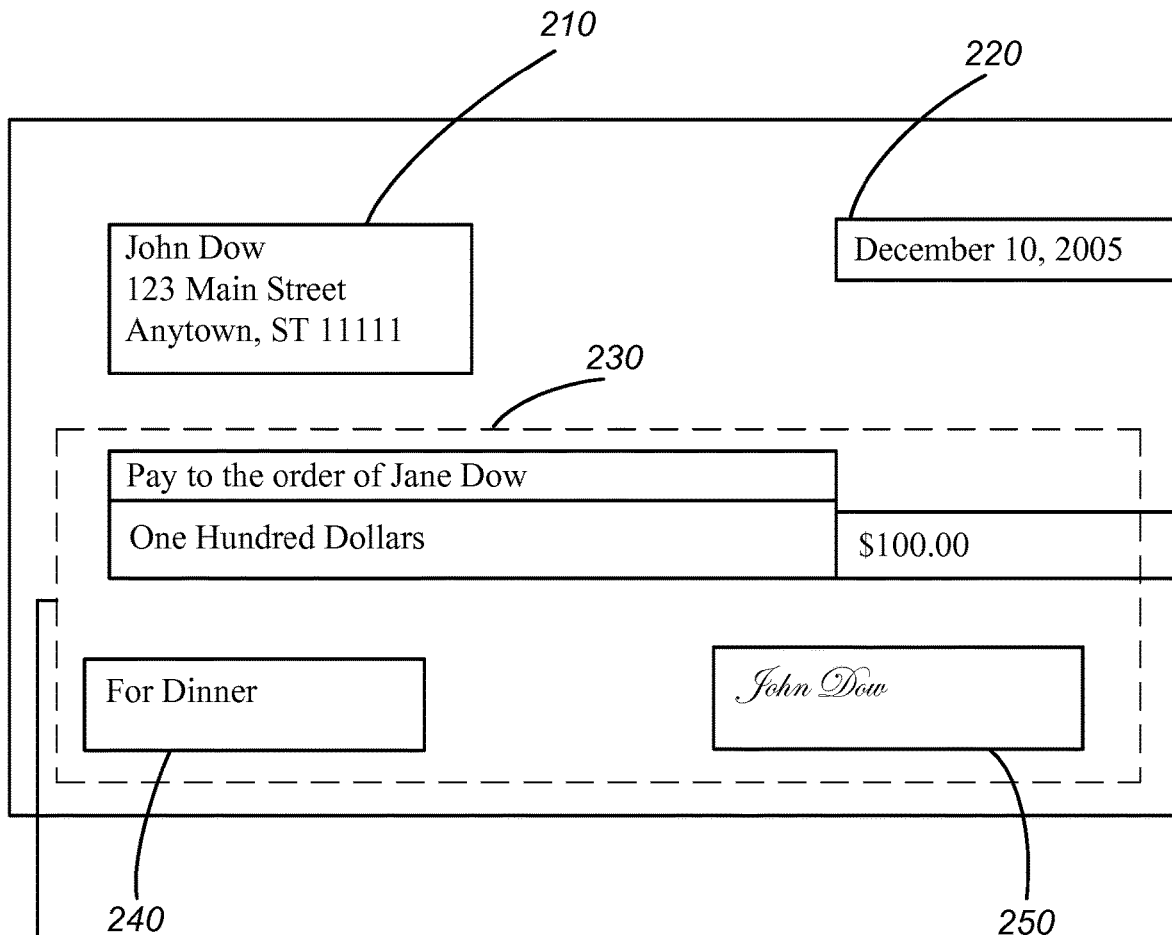
FIGS. 2-4 describe an embodiment of the invention that displays digital images of checks or other selected documents containing information to be secured.

A digital image of a check or a selected document can be chosen for secure display in accordance with the invention as shown in FIG. 2. The check or selected document can be designed with various shapes and sizes including relevant information printed thereon. Selected kinds of personalized information may be displayed or appear within the same general location or region on the face of the check or document. For example, the name and address information of an individual, e.g., payor, can be printed generally on the upper left hand corner 210 of foe check or selected document. The date appears often in the upper right had corner 220. The central portion 230 of the check or selected document may contain other kinds of sensitive information. For example, with respect to any selected document, this location may include information such as credit card numbers, bank account/routing numbers, account statements from financial institutions or graphical content. It shall be understood that the invention can be applied to protecting other kinds of non-textual information such as photographs, images, blueprints or schematics that should not be readily viewable by an observer. With respect to a check, as shown in FIG. 2, the central portion 230 often includes the name of the payee or to whom the check is written. The dollar amount for the check appears immediately below usually written or spelled out (one hundred dollars) as well as appearing numerically ($100). A memo line is also provided o the lower left hand corner 240 of the check that identifies for what the check was written. A space or line 250 can be provided at the lower right hand corner of the check where the signature of the payor appears.

Figure 3:
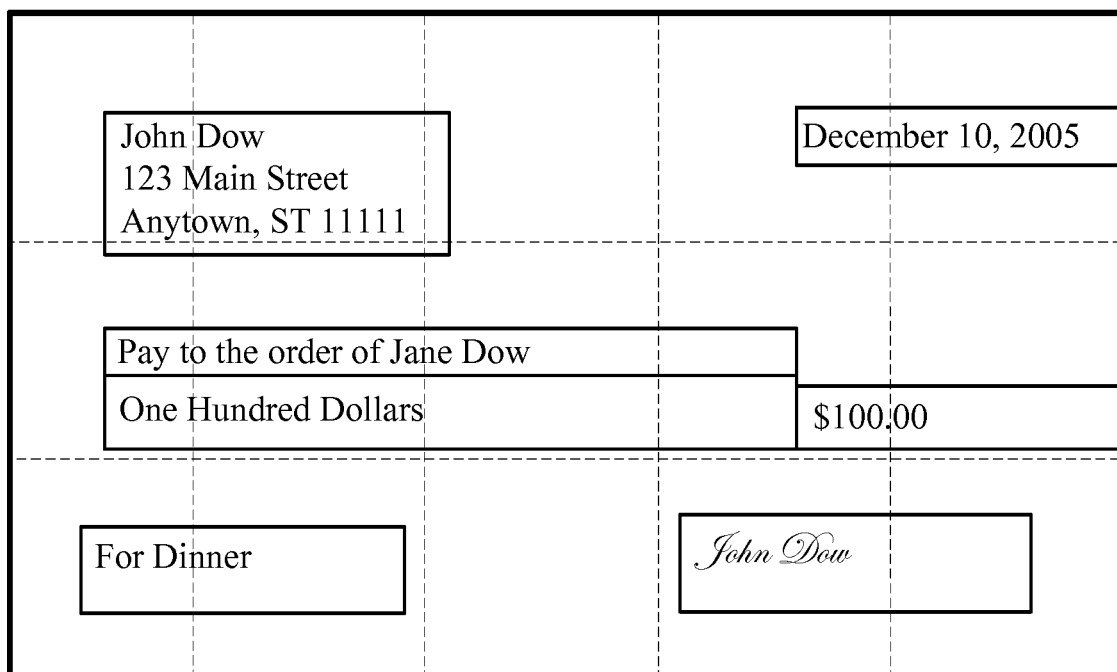

As shown in FIG. 3, the check can be conceptually divided into a plurality of image cells in accordance with the invention. The digital image of the check can be divided into a grid consisting of five (5) columns×three (3) rows. As with other embodiments of the invention described elsewhere herein, the image cells within the grid may be designated or separated into either redacted or un-redacted portions or cells. In some embodiments of the invention, the number of image cells within the grid may be predetermined or fixed by the party who wants to secure confidential information such as a payor or a bank having the account from which the check will be drawn against. When more image cells are selected, greater control can be provided over which regions of a check or a selected document can be secured in accordance with the invention. It shall be understood that the grids described herein may include any number of desired columns/rows and are not limited to rectangular or square shapes and can include image cells with different symmetrical or asymmetrical shapes and sizes.

Alternatively, the number and/or kind of image cells can be user defined. A user may select various image cell inputs designating the size, shape, and number of rows and columns for a desired grid. For example, a digital image can be divided into a plurality of image cells located within a rectangular grid based on user input values with a predefined number of rows and columns, e.g., 4 columns×3 rows. The grid may be characterized as a conceptual overlay upon the image so that the image can be broken-up or segmented into image cells that pertain to both redacted and un-redacted portions of the digital image. It shall be understood that image cells are not necessarily laid out in a grid like pattern with both rows and columns and can be alternatively arranged in any manner including a layout with cells that are aligned in only horizontal rows or only vertical columns.

Figure 4:
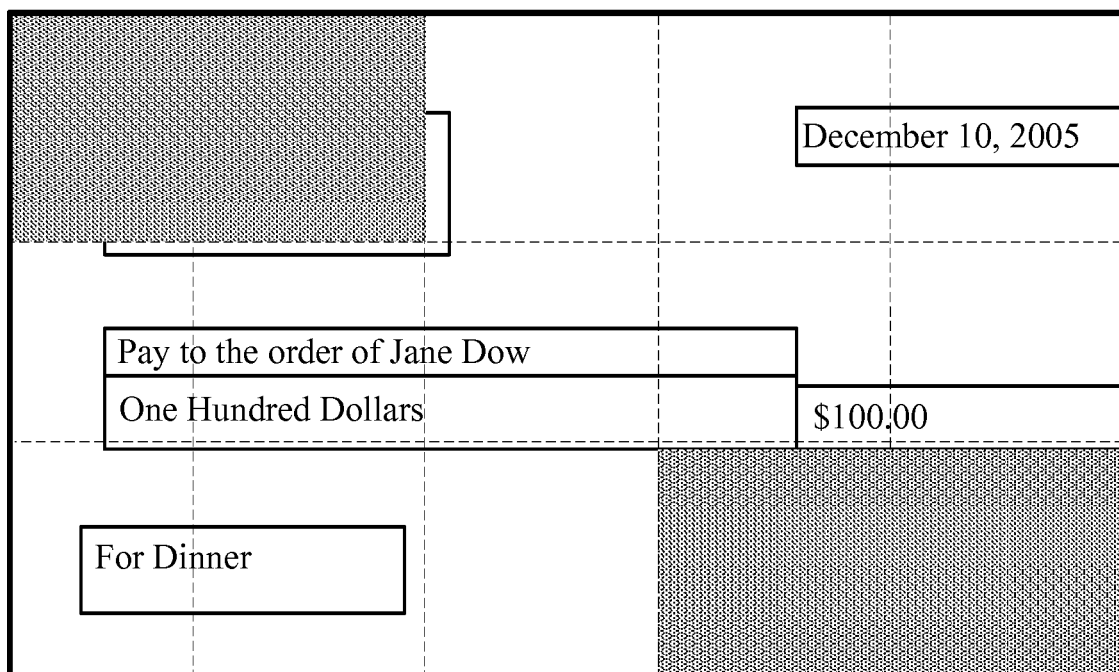

By selectively altering redacted portions of the digital image as shown in FIG. 4, sensitive information contained within the check or selected document can be protected. For example, one or more selected in image cells containing sensitive information can be identified within the grid. These image cells can be designated as the ones for editing or redaction. The image fragments contained within these selected image cells or redacted cells can be altered in appearance in accordance with the invention. Meanwhile, the remaining or non-selected image cells can be left untouched so that corresponding image fragments contained therein are plainly visible. Any graphics editing software tool or program may be used to alter or change the appearance of the image fragments within the selected image cells so that the sensitive information contained within the selected image cells will not be legible to an ordinary observer. In a preferable embodiment, the selected image cells can be grayed out (colored grey) entirely as shown so that any traces of the image fragments are not visible. Two selected image cells located at the upper left hand corner of the digital image, and two selected image cells located at the lower right hand corner, can be redacted to protect sensitive information otherwise visible, namely the name and address of the payor and a corresponding signature. In another preferable embodiment of the invention, a group of one or more selected image cells may be deleted or omitted from a digital image before delivering or transmitting it for secure viewing. The entire redacted digital images(s) to be viewed may thus comprise the entire group or all image cells (redacted and un-redacted) or only a selected subgroup of image cells (un-redacted) corresponding to the documents(s). Accordingly, the resulting digital image of the check or selected document can be displayed online or on a computer screen securely without sharing or disclosing sensitive information.

There are a variety of ways in which digital images can be redacted in accordance with the invention. For example, the step of redacting selected portions of a digital image can be achieved by a combination of one or more different means including graying or blacking out these areas. For purposes of this invention, the term "redacted" can mean a blurred, obscured, removed, blocked out, or crossed out so that underlying information cannot be seen and is not apparent on its face to an ordinary observer. Preferably, personalized information protected in accordance with the invention includes confidential subject matter such as personal data, financial or other types of information that can or should be shielded from general public viewing. Other ways to redact digital images in accordance with the invention may include various combinations of one or more techniques such as masking in solid colors (e.g., black, grey, white), pixelating or pixelizing, encrypting and/or otherwise rendering selected regions of a digital image illegible or indecipherable. In preferable embodiments of the invention, some legible portions of the digital image remain unredacted or plainly visible to reveal image fragments or contents of the document residing within these portions. It is often useful to provide at least some context and to relay some minimal amount of information to an observer but not to the extent such that sensitive information is revealed beyond an intended purpose.

FIG. 5 illustrates another embodiment of the invention that securely displays a digital image of a personal check containing a variety of sensitive information including a series of important numbers relating to a banking account. For example, a 9-digit number American Banking Association (ABA) routing transit number can be found at the bottom of the check adjacent to an account number from a financial institution. The ABA number or routing transit number is a sensitive piece of information that is often necessary to reorder checks, to set up direct deposits and recurring payments, or when preparing a wire transfer. The customer bank account number is another piece of sensitive information that should be guarded carefully to prevent identity theft and fraud. For many online banking purposes, it is not necessary to display these series of numbers. For example, bank customer may just want to determine whether a check has been properly endorsed, or by whom, by viewing an image of the back of a check. The customer may also want to inspect the front face of the check to confirm there has been no forgery or unauthorized alterations made. The unsecured display of such information online thus presents exposure to both the customer and the financial institution with no intended benefit in such circumstances. Accordingly, any digital images of checks that are available online can be secured in accordance with the invention to prevent unauthorized viewing by hackers or other persons who gain access to viewable online account information.

As shown in FIG. 5, the check includes additional personalized or sensitive information such as the payor name and address, a signature line, and routing transit/bank account numbers. Upon writing and cashing the check, a digital image of the instrument can be created using available scanning equipment and processes by a financial institution. It can be redacted and secured in accordance with the invention as described elsewhere herein. However a financial institution such as a bank may determine a methodology or process beforehand in which the check and other similar checks can be secured for online display. For example, the check can be initially scanned and saved. Digital images can be saved and loaded into memory of any type of computer system or network maintained by the financial institution. The digital image may be saved as a file that can be edited in accordance with the invention, or in other embodiments, the image may be derived from a stream of data as with other embodiments described herein. It shall be understood again that invention can be applied to electronic or digital images of any type of document where it may be desirable to alter the content of the image such that at least a portion of the image cannot be seen or is illegible. Electronic images of other documents may be selected besides personal checks such as deposit slips, bank statements, credit card bills, tax returns, or any other documents that may contain sensitive or personal information. In addition, the digital image of a hardcopy of a document may exist in various known formats including without limitation the following commonly used graphics file formats for displaying digital images on the World Wide Web: JPEG/JPG, GIF, PNG, TIF, TIFF, BMP, PSD, WMF, EMF, PCX, PIC and PDF.

In a preferable embodiment of the invention, as shown in FIG. 6, the financial institution can divide the digital image of the check into a plurality of image cells. A grid can be formed over the check or its image to provide a series of image cells arranged in rows and columns. While any number of image cells may be chosen and arranged in different ways, the check as shown is divided into thirty-nine (39) sections. The grid can be thus designed with three (3) rows and thirteen (13) columns. When more image cells are defined in accordance with this aspect of the invention, more flexibility is often provided in redacting selected portions of the check. The number of selected image cells or the number of rows or columns into which the digital image is divided may be based on user input. In this embodiment of the invention, the grid is created with vertical and horizontal lines such that the image is divided into rectangular-shaped image cells while in other embodiments the grid may comprise curved lines, or lines that do not form a regular pattern. Other embodiments may include any combination of the above, or may include any other division of the image as may be desired to carry out the invention. The image may be divided into any number of image cells which may be of any size, shape, orientation, or other configuration.

In some embodiments of the invention, a group of image cells formed within a grid can be identified by a marker to distinguish the image cell relative to others within the entire electronic image. The marker may be a reference number according to a numbering convention. In an exemplary numbering system, the image cells may be designated with sequential numbers starting with zero (0) or one (1) in the upper left corner of the grid. The image cells may be assigned numbers from left to right (each column) and continue from top to bottom (each row). While any unique identifier or number may be assigned in any order, methods are provided herein whereby each image cell is assigned a unique number until all image cells are identified. Other numbering or marking systems may be used to designate the position of the image cells within the grid including but not limited to an alphabetical system (A-Z), an alphanumeric system (A1, A2, . . . Z10) or a color coded system may be used to uniquely label the plurality of image cells. In some embodiments of the invention, a simple binary-type cell identifier system can be also adopted. Each image cell would not have to be uniquely identified from every other image cell. For example, each image cell corresponding to a portion of a digital image may be designated either as a redacted cell or not (un-redacted cell). Any or all image cells designated as redacted cells can be altered while un-redacted cells remain visible in accordance with this embodiment the invention.

Figure 7:
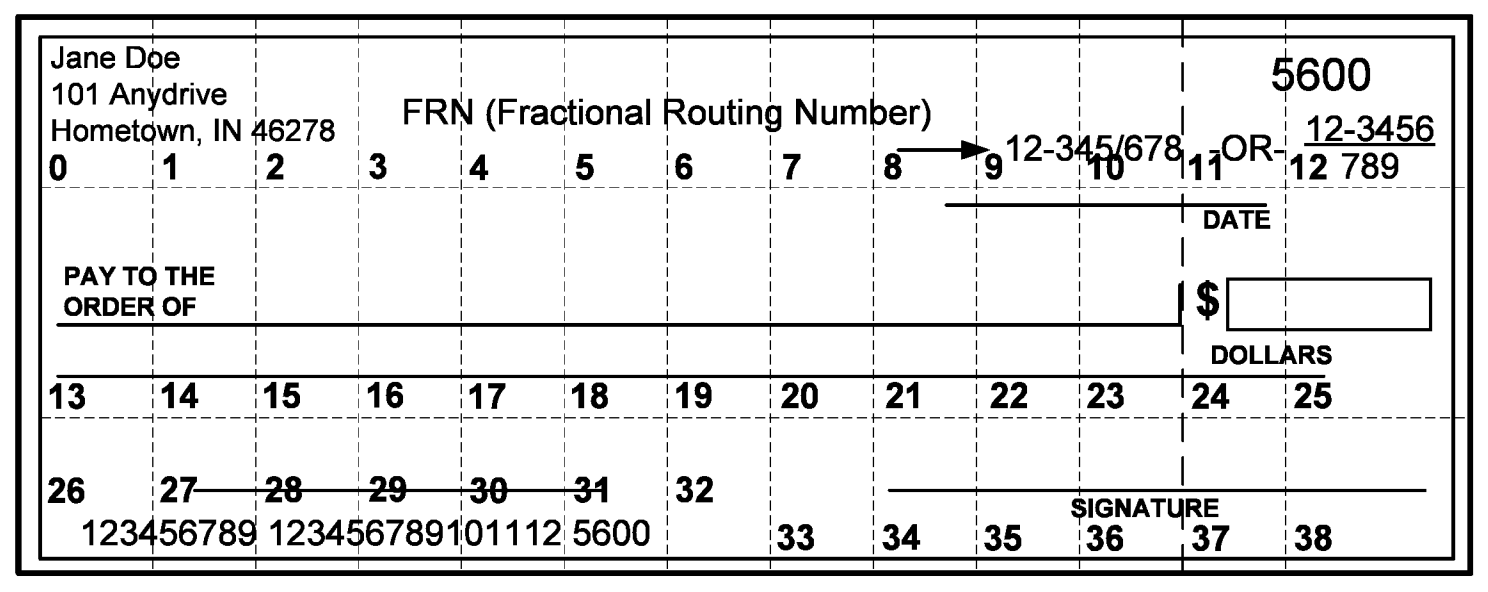

FIG. 7 illustrates a preferable embodiment of the invention whereby a plurality of image cells is identified using numerical cell identifiers ranging from zero (0) to thirty-eight (38). The cell identifiers begin with the number zero (0) in the upper left cell and may continue sequentially across the columns and in a row-by-row manner until all image cells are assigned a number ending with the number thirty-eight (38). Three rows of thirteen image cells are therefore created to provide a thirteen (13) by three (3) grid corresponding to portions of the digital image. In accordance with this aspect of the invention, the digital image may be redacted according to selected identifiers. This redaction may be accomplished by selecting a group of one or more cell identifiers corresponding to portions of the digital image containing sensitive information. The image fragments residing within these image cells can be redacted. Selecting cell identifiers for redaction may be accomplished by user input indicating which image cell identifiers, and thus their corresponding image cells, are to be redacted. A computer program may also include instructions or computer code to automatically select which image cell(s) are to be redacted based on corresponding image cell identifiers. Such computer code may further carry out steps to automatically redact a digital image according to selected cell identifiers. Accordingly, a first digital image can be altered by having at least one image cell redacted to provide a second digital image wherein the redacted image cell is illegible, thus securing personalized content.

Figure 8:
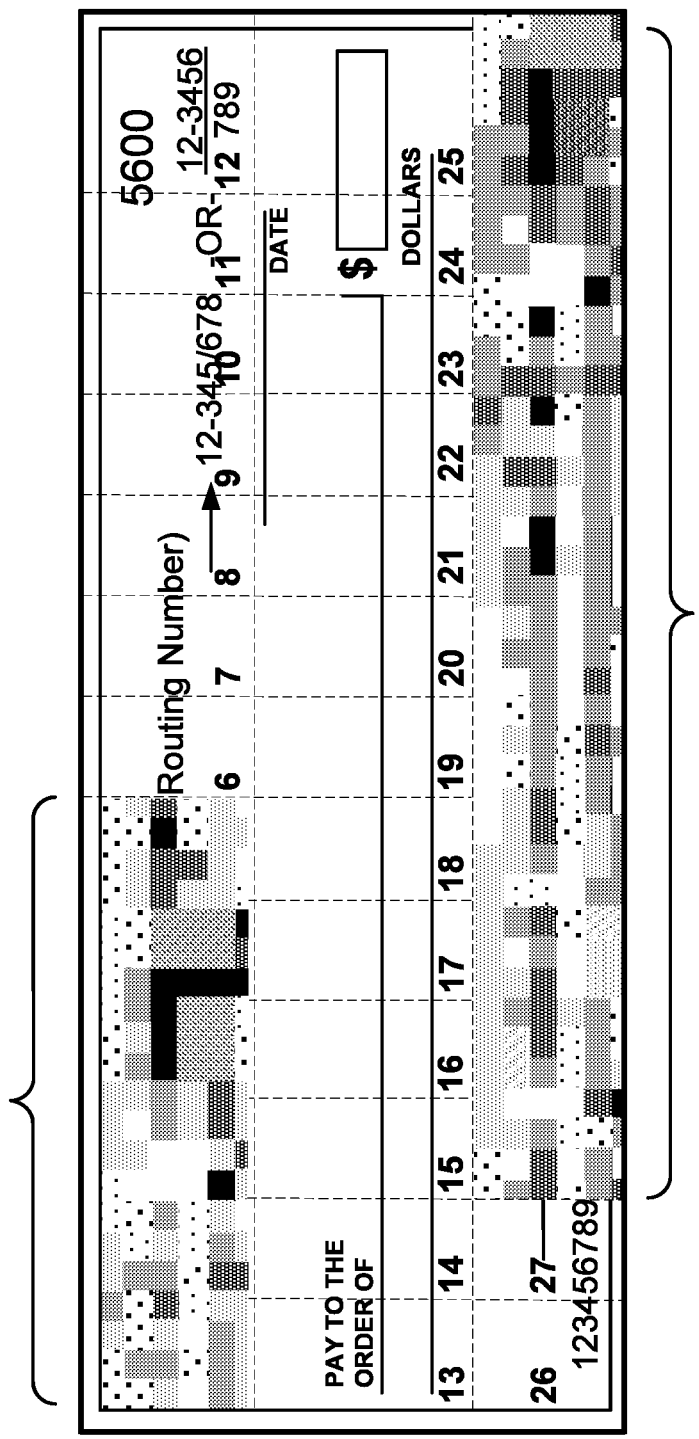

As shown in FIG. 8, a predefined group of image cells within the grid can be selected for redaction. Because the name and address of an individual often appears on the upper left hand corner of a check, image cells 1 through 5 can be selected for redaction as these cells correspond to that portion of the document or digital image. At the same time, since the routing transit and bank account numbers often appear along the bottom edge of a check, image cells 28 through 38 can be selected for redaction as these cells correspond to that portion of the check. Any number of image cells may be selected for redaction in order to partially or entirely secure information. For example, partial routing transit numbers may partially appear while the entire account number for a payor is completely illegible. In other instances it may be necessary or desired to reveal certain kinds of information appearing on the check such as the fractional routing number (FRN). So the image cells corresponding to this portion of the image (e.g., image cells 9 through 10) are not selected for redaction. Upon selection of the image cells that are to be redacted, a graphics editing tool or program can be used to redact those portions of the image in order to protect otherwise visible information. In this illustrated embodiment of the invention, the image cells chosen for redaction were masked or rendered illegible by pixelating the image cells or the portions of the digital image corresponding to the image selected cells. Other methods may be used to redact the image cells besides pixelating including but not limited to graying out, encrypting, blurring, masking, or drawing a line through all or just a portion of an image cell. In alternative embodiments, the redacted cells can be blurred or pixelated, wherein the blurring or pixelating is achieved by utilizing a blur size parameter to designate the of the blurred area. A blur size may be, e.g., but not limited to, ten (10) by ten (10) pixels.

The selected image cells to be redacted can be identified according to markers or cell identifiers that direct the editing tool or program as to which portions of the digital image should be redacted. It shall be understood that information to be secured within checks or any other selected document in accordance with the invention may reside in slightly or entirely different locations therein. An appropriate number of image cells may be chosen in order to offer at least some minimal level of security to at least partially redact information positioned within a digital image since checks or any other selected document may vary in size and shape. Accordingly, a financial institution such as a bank may therefore decide beforehand how much or which portions of customer checks should be generally available for online display.

Figure 9:
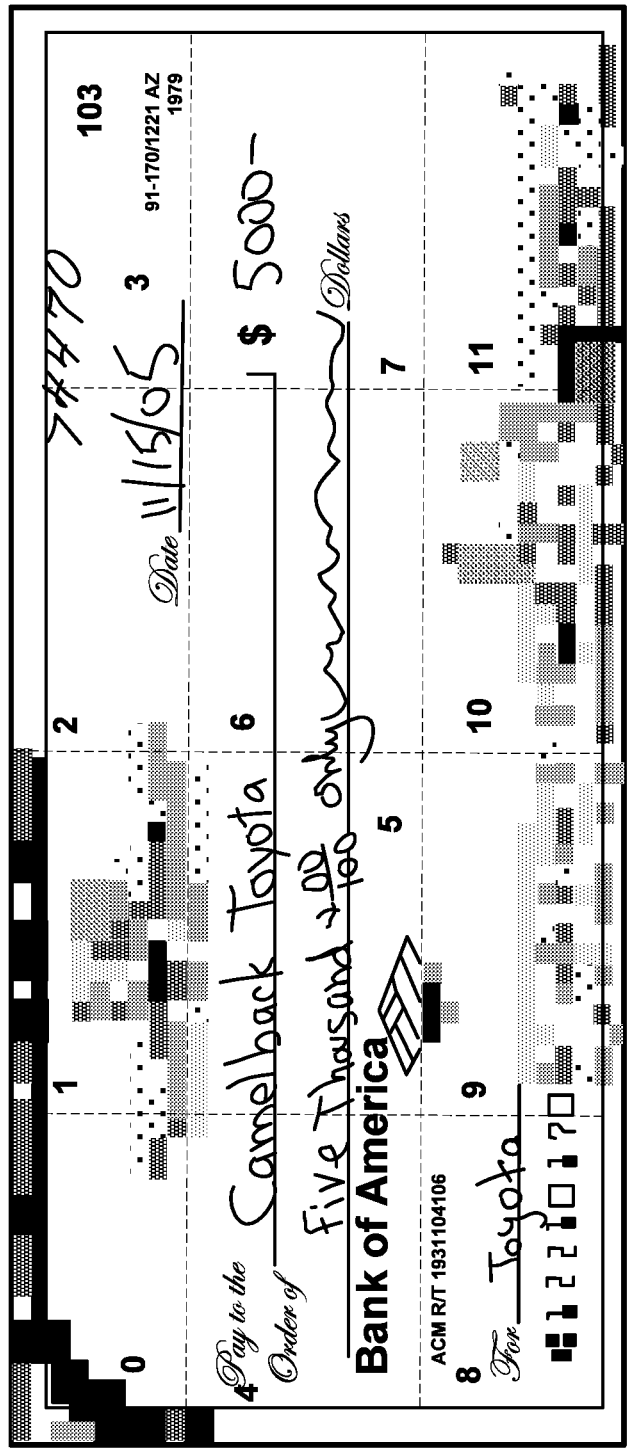
FIG. 9 illustrates a redacted digital image of a cashed personal check that is processed in accordance with another aspect of the invention.

FIG. 9 illustrates yet another embodiment of the invention that is applicable to personal checks. The personal check in this figure appears as it would to an ordinary observer on a display or monitor after it has been partially redacted in accordance with the invention. In this instance, a grid with three (3) rows by four (4) columns was selected that divides the digital image into twelve (12) image cells. After the check is cashed, the payor/account holder/customer may want to view the check on a home computer through an online banking system. Through a web browser, for example, the payor or any other person may select for viewing the cashed check (front/back images). Regardless of whether the image of the check has been intercepted or viewed by someone without permission, the relatively sensitive information contained thereon is secured in accordance with the invention. The digital image of the already scanned paper (hardcopy) document is redacted to conceal information such as the payor name and address, the routing transit and bank account numbers, plus the payor's signature which could otherwise be studied to commit forgery. Meanwhile, certain kinds of information can be visible to give some context and to convey some basic information that my be deemed useful but relatively non-sensitive or non-personal, e.g., date, name of payee, name of bank, dollar amount, purpose of check. In this illustration, image cells 0 through 1 and 9 through 11 were selected for redaction. The secured information has been redacted by pixelation and masked from view. The image cells could have been alternatively redacted by other masking techniques described elsewhere herein, or otherwise blackened or grayed out, partially or completely. As illustrated in this embodiment, selected image cells can be partially rather than entirely redacted. This degree of controlled redaction can be achieved based on the technique selected such as pixelation in this embodiment. It may be desirable to pixelate only certain portions of the image cells leaving other pixels corresponding to some image fragments within such cells intact and viewable. As with other embodiments of the invention, it may be thus desirable to only partially redact an image cell containing personalized information.

While masked or redacted images provided herein may be advantageous for securing personalized content, a user or customer may wish to view the original unredacted image or document. An alternative embodiment of the invention may offer this by presenting a complete digital image to an authorized person following an authentication procedure. A user may view an original unredacted image online after providing for example a user identification and password. It shall be understood that the invention may be also applied to digital image encryption/decryption schemes such as those disclosed in U.S. Pat. No. 6,954,532 (Handley et al), which is incorporated by reference in its entirety herein. But preferable embodiments of the invention herein can provide document security without encryption/decryption schemes or segmenting digital images into conceptual layers. For example, redacted portions of documents (e.g., pixelated) provided in accordance with the invention may be permanently altered and considered unredactable (e.g., unpixelated) by anyone including even the creator of the document. Other alternative embodiments of the invention however provide temporarily redacted documents that can be unredacted, preferably without public/private key encryption and decryption techniques wherein redacted images shared online include embedded public key information. Such keyless redaction and unredaction techniques such as pixelating/unpixelating according to graphical editing software programs (e.g., Adobe PhotoShop) that are known only by authorized users or viewers can be also can be applied to embodiments of the invention herein. Alternatively, the unredacted image may be presented following some predetermined level of second level authentication online (or ordered through paper mail or made available and a local branch of a financial institution).

Figure 10:
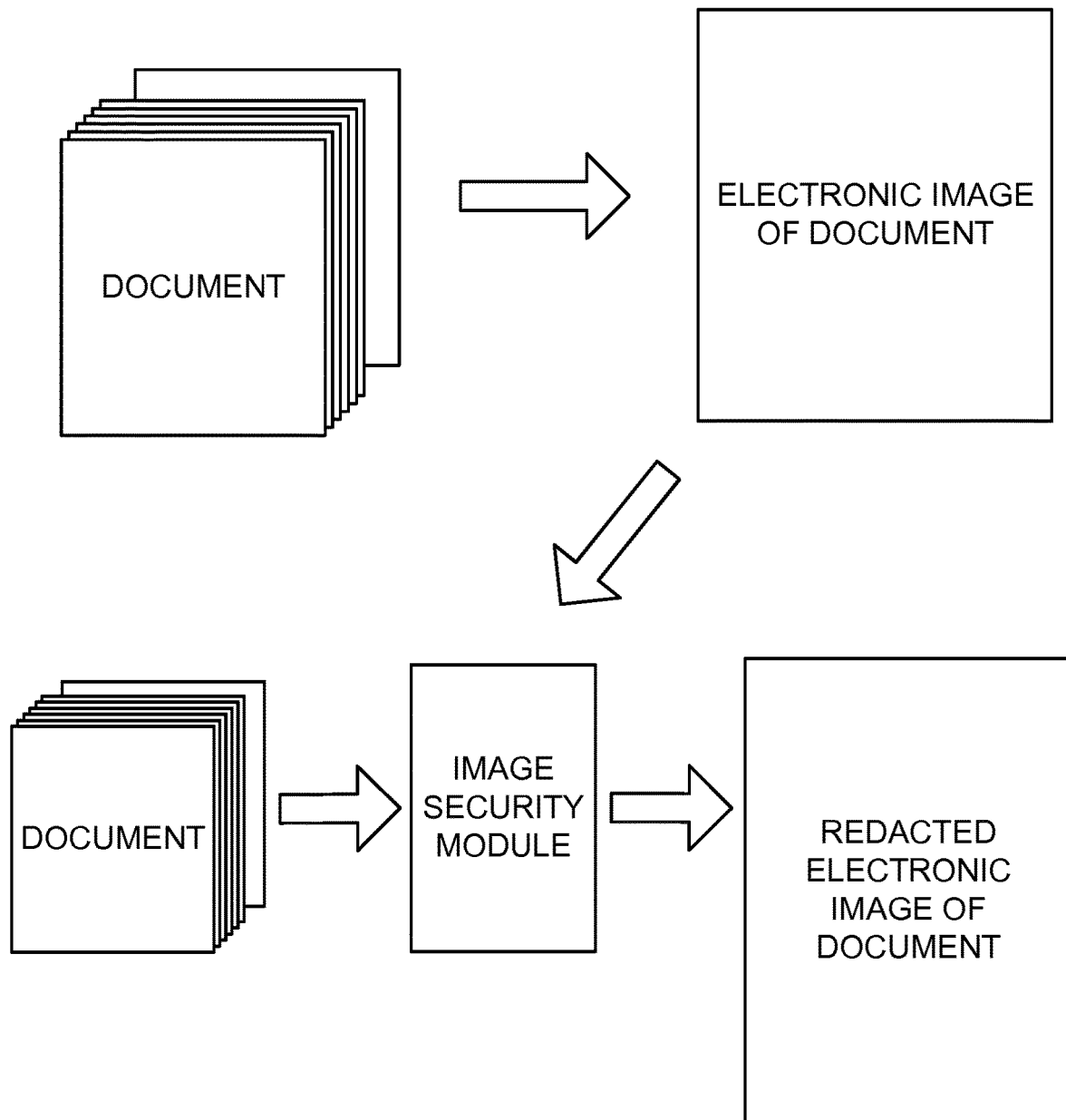
FIG. 10 describes a system for securing digital images from already digitally scanned documents or directly from paper documents with an image security module according to yet another aspect of the invention.

In accordance with yet another aspect of the invention, as shown in FIG. 10, one or more hardcopy paper documents can be modified to secure selected information contained therein. The digital image of an already scanned document can be redacted, or alternatively, paper documents can be scanned and converted directly into secured digital images. For example, an original unredacted group of one or more documents can be scanned to generate electronic images using image scanning tools or equipment. Such apparatus may have Optical Character Recognition (OCR) capabilities and be able to scan paper copies to generate unredacted digital images according to a preselected digital image format such as a JPEG format, for example. The image(s) may be subsequently redacted and converted by upon execution of a computer software program for redacting digital images that resides in the memory of a computer provided in accordance with another aspect of the invention described herein. A computer running the software program (redactor) may contain an image security module that redacts selected portions of the already scanned digital images to secure certain information as described elsewhere herein. The image security module may optionally convert the first unredacted digital image existing in a first format (JPEG) into a second redacted digital image existing in a second format (PDF). It shall be understood that the redactor and/or image security module may operate independently as a stand alone application software program or an add-on tool for commercially available image scanning and conversion programs.

FIG. 10 illustrates another embodiment of the invention whereby paper documents are directly scanned and secured by the image security module. It shall be understood that the image security module may be a computer program or set of instructions to carry out a method of redacting digital images of hardcopy documents, or it may be a discrete set of instructions or a combination of subroutines to perform functions such as the scanning and/or redacting of documents as described herein. For example, a group of one or more selected paper hardcopy documents can be processed by the image security module to redact certain portions thereof. When the documents are relatively uniform, in appearance, e.g., shape, size, font, a common group of image cells corresponding to similar portions of the documents can be scanned and redacted in accordance with other aspects of the invention described elsewhere herein. However when the documents to be scanned and redacted are not uniform, or if different regions of similar or uniform documents are to be redacted, then the image security module can selectively redact digital images accordingly such that resulting digital images of the documents protect information residing at different portions of the scanned documents. Either the redacted digital images of the paper documents can be rendered for immediate display, or they can be stored for later viewing after being processed by the image security module to mask or hide sensitive information appearing on the face of the documents. Accordingly, paper documents can be scanned and directly converted into redacted digital images by the image security module.

Various aspects of the invention herein may scan paper documents, or convert digital images of documents, into any digital image format. The following is a description of some of the most commonly used graphics file formats for putting graphics on the World Wide Web that may be applied to the invention.

JPEG/JPG. Short for Joint Photographic Experts Group, the original name of the committee that wrote the standard. JPG is an image file format supported on the Web that is a lossy compression technique designed to compress color and grayscale continuous-tone images. The information that is discarded in the compression is information that the human eye cannot detect JPG images can support 16 million colors and are suitable for photographs and complex graphics. A user may have to compromise on either the quality of the image or the size of the file. JPG may not work well on line drawings, lettering or simple graphics.

GIF. Short for Graphics Interchange Format, another of the graphics formats supported by the Web. Unlike JPG, the GIF format is a lossless compression technique and it can support 256 colors. GIF may be viewed as a preferred format over JPG for images with only a few distinct colors, such as line drawings, black and white images and small text that is only a few pixels high. With an animation editor, GIF images can be put together for animated images. GIF also supports transparency, where the background color can be set to transparent in order to let the color on the underlying Web page to show through.

PNG. Short for Portable Network Graphics, it is another graphics standard found on the Web but is not supported by all browsers. An image in a lossless PNG file can be 5%-25% more compressed than a GIF file of the same image. PNG builds on the idea of transparency in GIF images and allows the control of the degree of transparency, known as opacity. PNG does not support animation like GIF does.

It shall be understood that the invention herein can redact and convert or produce document images from many other different types of image formats such as TIF, TIFF, BMP, PSD, WMF, EMF, PCX, PIC and PDF formats.

Another aspect of the invention provides automated high throughput processes wherein a large number of digital images can be generated and/or secured on-the-fly (real time). For example, many checks from various financial institutions often adopt a relatively standard or substantially similar format. Because checks usually include the same kinds of information, their corresponding images can be similarly redacted (batch redacted) without individual manual editing or redacting with software programs such as Adobe PhotoShop. A variety of automated processes and systems are provided herein to redact sensitive information from digital images of documents for display online or through other communication channels as part of a high throughput process. With respect to checks, the image masking systems and processes herein can leverage the fact that personal or sensitive information often appears in common locations as described elsewhere herein. The front side of a check, for example, may include the payor address in an upper left side area while the routing number and account number may appear along the bottom near the signature of the payor. Digital images of a plurality of checks, for example, can be secured or altered in an automated batch process, thus requiring less time than would be required if the images were scanned and/or secured individually. A grid constructed with a plurality of image cells can be designed for the checks as described herein so that commonly selected (or the same) image cells can be redacted on-the-fly for each corresponding check. The selection of a sufficient number and/or location of image cells for redaction may be considered in view of modest variations existing as between different checks (different sizes, fonts and layouts). Some information on checks may be more edited or redacted compared to others but enough cells should be appropriately selected for redaction in order to sufficiently mask the check images to afford at least some level of protection, e.g., at least 5 digits from a 9 digit routing transit number should be redacted while 6, 7 or mote digits may be redacted in some checks. The digital images of the checks or any other document containing information to be protected herein can be therefore dynamically divided and masked in accordance with the invention on-the-fly, and preferably as part of a batch processing of checks or other documents by a financial institution, merchants and other parties desiring secure digital images.

For example, referring to FIG. 10, an image security module may perform a batch security process to securely display cashed checks for viewing by banking customers. In a preferable embodiment of the invention, the hardcopy paper versions of the checks (presumably cashed and held by a bank) can be digitally scanned using high volume paper scanners to capture and create digital images of (both front and back sides) the checks. A series of one or more image files such as PDF files can be created containing electronic images of the checks in unredacted form. This image data can be thereafter processed by an image security module to create redacted electronic images of the checks for secure viewing in accordance with other aspects of the invention described elsewhere herein. The image masking systems and methods herein can perform a wrapper function around existing image content by taking an already scanned document and blurring or redacting relevant parts of the digital image before presenting it to an end user. Alternatively, the digital image information corresponding to the checks upon scanning can be fed directly into the image security module whereby the function of redacting selected portions of the digital images are performed without generating unredacted digital versions of the checks. For some applications, it may be more useful to only create and/or store redacted electronic images of checks. No duplicate images are generated at all which reveal sensitive information according to this embodiment of the invention. Accordingly, this aspect of the invention allows a plurality of checks or any other documents with similarly located information to be redacted more efficiently and faster in time than if the digital images were redacted individually.

Other embodiments relating to this aspect of the invention can provide batch processing of digital images for other kinds of documents containing confidential or sensitive information described elsewhere herein to protect against identity theft, fraud and other kinds of illegal activity.

In an online application of the invention that securely displays digital images, the following data flow can be implemented: a user requests a page with a dynamic image content (such as a check); a server returns a HTML page with a reference to a back end service that can provide the image; a browser intercepts the <IMG> tag and follows the SRC link to retrieve the image; the service behind the <IMG> link interprets the request and locates the image in a repository (e.g., scanned documents created as shown in FIG. 10); and an image stream can be buffered and streamed back to the client browser. Accordingly, a straightforward and simple integration of the invention can be accomplished with an existing process whereby a server retrieves or receives an already scanned digital image, which is passed through an image security module, e.g., including Image-Mask module, before sending the redacted (masked) image to a client (customer browser).

A preferable embodiment of the invention performs a wrapper function around an existing image content call, for example, when a customer desires to view a cashed check. This Java API function call can take the image and mask relevant parts in accordance with the invention herein before resolving an updated redacted image to an end user. The typical delivery process and image can retain intact, processing time can be negligible and no duplicate images are generated.

Figure 11:
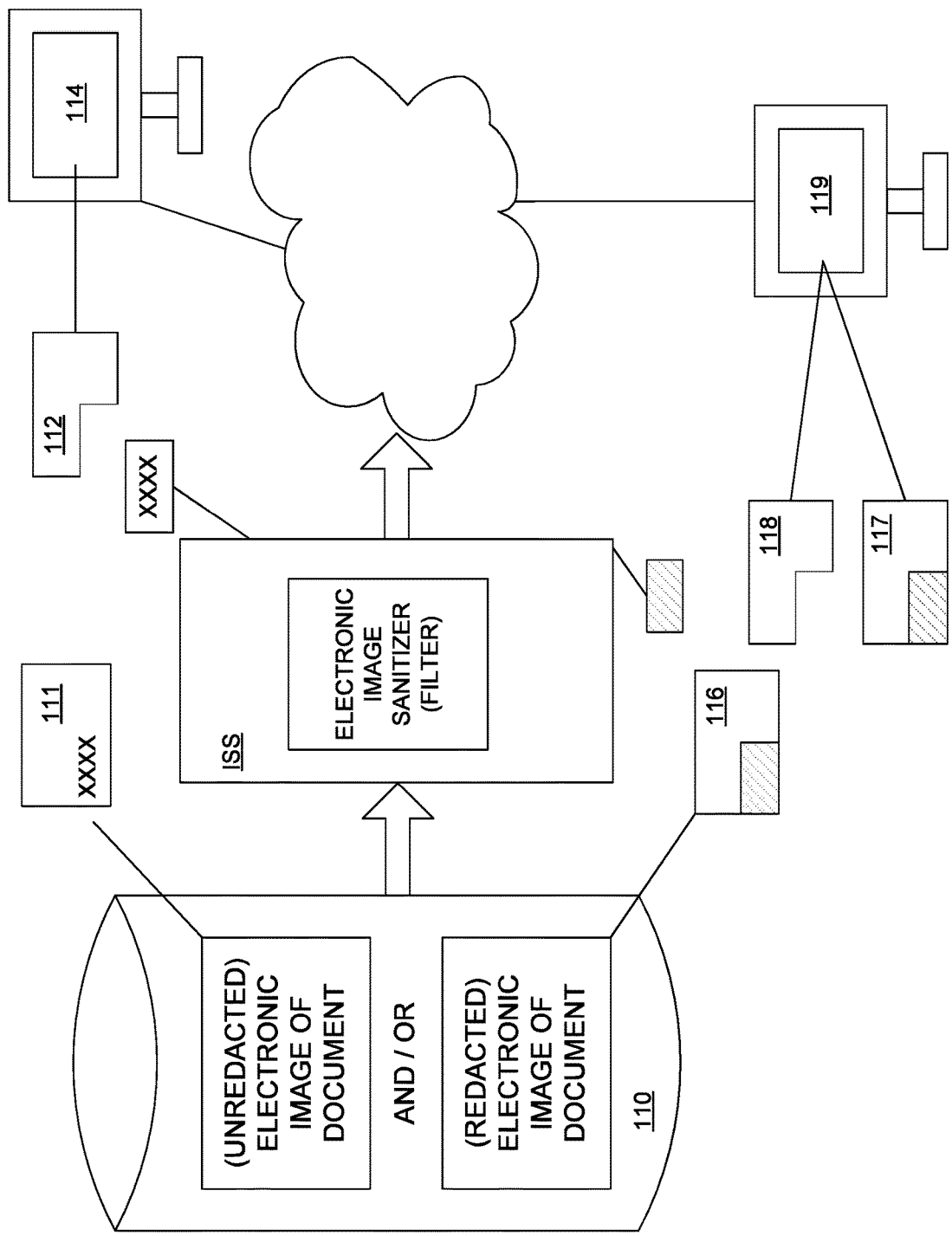
FIG. 11 described a system for securing digital images with an electronic image sanitizer that can filter out and send only sections of an electronic image for secure viewing.

In accordance with another aspect of the invention, a database or repository of digital images can be created as shown in FIG. 11. It shall be understood that the repository may be maintained and integrated as part of an overall banking system or other network providing secured display of sensitive documents. The plurality of digital images may include both redacted and unredacted electronic images of documents. Such documents include bank checks, statements and any other documents containing sensitive information including those described elsewhere herein. The documents in the repository may be processed by an image security system (ISS) before their images are transmitted or streamed to viewers across a network like the Internet for viewing on a computer or device browser. The image security system may include one or more servers and computers containing computer programs for securing digital or electronic images of documents in accordance with other aspects of the invention. A server may retrieve a digital image from a repository, which is then passed through the image security system, before sending the redacted image to a client (customer browser). In addition to or instead of containing an image security module (see FIG. 10) and other programs, a computer memory in the image security system may also include an electronic image sanitizer. The electronic image sanitizer may be a software program or module with computer implemented instructions or code that filters out selected portions of an image before transmission for viewing. The selected portions of the image may be created and divided into multiple images cells as described elsewhere herein.

For example, the electronic image data for a document such as a cashed personal check may be stored in the repository 110. When the document exists in its unredacted form, its image may be divided into a plurality of image cells so that certain selected cells containing sensitive information can be identified in accordance with other aspects of the invention (e.g., FIG. 9). The image data corresponding to the selected cells can be filtered out by the electronic image sanitizer. The filtered data can be discarded or optionally retained (XXXX) by the security system. So only some and not all image cells of the document are transmitted for secured viewing. The image data and related pixel information corresponding to areas of the document containing sensitive information can be thus omitted from transmission. A sanitized document 112 can therefore be made available for viewing on a computer browser 114 that visibly excludes sensitive information.

Alternatively, a document may exist in the repository in its redacted form 116 following image data processing in accordance with other aspects of the invention. In this embodiment of the invention, the document may have been already redacted by the image security module so that sensitive portions of the document are not legible when rendered on a computer browser or device screen 119. Here the image security system may transmit directly or indirectly a complete set of image data for a document 117 including both redacted and unredacted portions. The transmitted image data may include information corresponding to redacted image cells (solid masked and/or pixelated image portions) and unredacted image cells. But in alternative embodiments of the invention, the data for some image cells (cross-hatch/shaded section), preferably the ones corresponding to confidential or sensitive information in a document, are not transmitted at all and omitted from the relayed image data to render a sanitized document 118 for viewing on a display. This may reduce the amount of data sent over the networks to a remote user device, and also provides added security in that the data corresponding to sensitive information does not even leave a secure computer network such as those operated by financial institutions. Selected image data or data streams corresponding to repository documents can be buffered and streamed back to a client browser or display for secure viewing. Accordingly, this aspect of the invention provides systems and processes for sanitizing a digital representation of a document for viewing.

The embodiments of the invention which perform sanitization of documents and data herein may be characterized as systems and processes for removing sensitive information from a document or other medium so that it may be securely distributed. When dealing with sensitive or classified information, sanitization may convert an otherwise classified document into an unclassified document. For example, a page of a classified document may be sanitized for public release in accordance with the invention. Classified information may be removed so that only the unclassified information is available or visible. A printed document which contains classified or sensitive information will frequently contain significant information which is less sensitive. And, there may be a need to release the less sensitive portions to uncleared personnel or members of the general public such as requests under the Freedom of Information Act (FOIA). The printed document may thus be sanitized to remove the sensitive information, or as with any of the embodiments of the invention herein, the document may be redacted to obscure the information instead. The terms sanitization and redaction as used herein may be applied to printed or paper documents as well as computer media, information and data as well.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. An image security system for editing a digital image, the image security system comprising:
    a non-transitory data store configured to store a plurality of digital images and division patterns associated with a plurality of predetermined document types;
    a computer processor programmed to:
        access a digital image of a scanned document from the plurality of digital images, the scanned document associated with a predetermined document type of the plurality of predetermined document types;
        divide the digital image of the scanned document into a plurality of image cells according to a division pattern associated with the predetermined document type;
        assign each of the plurality of image cells with a cell identifier;
        select from the plurality of image cells at least one image cell, a first image cell of the at least one image cell selected based on a location of the first image cell within the digital image;
        identify a first cell identifier associated with the first image cell;
        perform a first redacting operation on a first portion of the first image cell based at least in part on the first cell identifier, wherein the first portion of the first image cell displays sensitive information, and wherein the first redacting operation is of a first redaction type comprising at least one of: encrypting, blurring, masking, or inserting a line over all or just a portion of the first image cell;
        select a second image cell from the at least one image cell, the second image cell selected based on a location of the second image cell within the digital image; and
        perform a second redacting operation on a first portion of the second image cell, wherein the first portion of the second image cell displays sensitive information, wherein the second redacting operation is of a second redaction type comprising at least one of:
    encrypting, blurring, masking, or inserting a line over all or just a portion of the second image cell, and wherein the second redaction type is different from the first redaction type; and
        generate a digital image based at least in part on an output of the first redacting operation and the second redacting operation.

2. The image security system of claim 1, wherein a portion of the first image cell comprises non-sensitive information.

3. The image security system of claim 1, first image cell and the second image cell are of different sizes.

4. The image security system of claim 1, the computer processor is further programmed to perform a third redacting operation on a second portion of the first image cell, wherein the third redacting operation is of a third redaction type comprising at least one of pixelating, encrypting or obfuscating of the second portion, and wherein the first redaction type is different from the third redaction type.

5. The image security system of claim 1, wherein a number of plurality of image cells associated with the division pattern is based at least on the predetermined document type and a desired level of security associated with the predetermined document type.

6. A method for automatically editing a digital image, the method comprising:
    accessing, from a non-transitory data store, a digital image of a scanned document, the non-transitory data store storing a plurality of digital images and division patterns associated with a plurality of predetermined document types;
    accessing, from the non-transitory data store, a division pattern associated with a document type of the scanned document;
    dividing the digital image of the scanned document into a plurality of image fragments according to the division pattern;
    assigning each of the plurality of image cells with a cell identifier;
    selecting from the plurality of image cells at least one image cell, a first image cell of the at least one image cell selected based on a location of the first image cell within the digital image;
    identifying a first cell identifier associated with the first image cell;
    performing a first redacting operation on a first portion of the first image cell based at least in part on the first cell identifier, wherein the first portion of the first image cell displays sensitive information, and wherein the first redacting operation is of a first redaction type comprising at least one of: encrypting, blurring, masking, or inserting a line over all or just a portion of the first image cell;

selecting a second image cell from the at least one image cell, the second image cell selected based on a location of the second image cell within the digital image; and performing a second redacting operation on a first portion of the second image cell, wherein the first portion of the second image cell displays sensitive information, wherein the second redacting operation is of a second redaction type comprising at least one of: encrypting, blurring, masking, or inserting a line over all or just a portion of the second image cell, and wherein the second redaction type is different from the first redaction type; and generating a digital image based at least in part on an output of the first redacting operation and the second redacting operation.

7. The method of claim 6, wherein a reminder of the first image cell comprises non-sensitive information.

8. The method of claim 6, wherein the first image cell and the second image cell are of different sizes.

9. The method of claim 6, further comprising performing a third redacting operation on a second portion of the first image cell, wherein the third redacting operation is of a third redaction type comprising at least one of pixelating, encrypting or obfuscating of the second portion, and wherein the first redaction type is different from the third redaction type.

10. The method of claim 6, wherein a number of plurality of image cells associated with the division pattern is based at least on the predetermined document type and a desired level of security associated with the predetermined document type.

11. A non-transitory computer storage having stored thereon a computer program, the computer program including executable instructions that instruct a computer system to at least:

access, from a non-transitory data store, a digital image of a scanned document, the non-transitory data store storing a plurality of digital images and division patterns associated with a plurality of predetermined document types;

access, from the non-transitory data store, a division pattern associated with a document type of the scanned document;

divide the digital image of the scanned document into a plurality of image fragments according to the division pattern;

assign each of the plurality of image cells with a cell identifier;]

select from the plurality of image cells at least one image cell, the first image cell of the at least one image cells selected based on a location of the first image cell within the digital image;

identify a first cell identifier associated with the first image cell;

perform a first redacting operation on a first portion of the first image cell based at least in part on the first cell identifier, wherein the first portion of the first image cell displays sensitive information, and wherein the first redacting operation is of a first redaction type comprising at least one of: encrypting, blurring, masking, or inserting a line over all or just a portion of the first image cell;

select a second image cell from the at least one image cell, the second image cell selected based on a location of the second image cell within the digital image; and perform a second redacting operation on a first portion of the second image cell, wherein the first portion of the second image cell displays sensitive information, wherein the second redacting operation is of a second redaction type comprising at least one of: encrypting, blurring, masking, or inserting a line over all or just a portion of the second image cell, and wherein the second redaction type is different from the first redaction type; and generate a digital image based at least in part on an output of the first redacting operation and the second redacting operation.

12. The non-transitory computer storage of claim 11, the executable instructions further instruct the computer system to perform a third redacting operation on a second portion of the first image cell, wherein the third redacting operation is of a third redaction type comprising at least one of: pixelating, encrypting or obfuscating of the second portion, and wherein the first redaction type is different from the third redaction type.

13. The non-transitory computer storage of claim 11, wherein the first image cell and the second image cell are of different sizes.

14. The non-transitory computer storage of claim 11, wherein a number of plurality of image cells associated with the division pattern is based at least on the predetermined document type and a desired level of security associated with the predetermined document type.

* * * * *

UNITED STATES PATENT AND TRADEMARK OFFICE
CERTIFICATE OF CORRECTION

| | |
|---|---|
| PATENT NO. | : 10,726,151 B2 |
| APPLICATION NO. | : 15/619331 |
| DATED | : July 28, 2020 |
| INVENTOR(S) | : Ori Eisen et al. |

It is certified that error appears in the above-identified patent and that said Letters Patent is hereby corrected as shown below:

On the Title Page

On Page 7, Column 2, Item (56), Lines 45-46 (Approx.), under Other Publications, delete "8159110.9)," and insert --8159110.9,--.

On Page 8, Column 1, Item (56), Line 23, under Other Publications, delete "Appl." and insert --Patent Appl.--.

In the Specification

In Column 1, Line 5, delete "patent application" and insert --Patent Application--.

In Column 1, Line 6, delete "patent application" and insert --Patent Application--.

In Column 1, Line 8, delete "patent application" and insert --Patent Application--.

In Column 1, Line 47, delete "abo" and insert --also--.

In Column 2, Line 27, delete "of" and insert --or--.

In Column 2, Line 56, delete "preferably" and insert --preferable--.

In Column 3, Line 23, delete "protocol" and insert --protocols--.

In Column 4, Line 3, delete "described" and insert --describes--.

In Column 5, Line 19, delete "foe" and insert --the--.

In Column 5, Line 46, delete "un-redacted" and insert --unredacted--.

Signed and Sealed this
Third Day of November, 2020

Andrei Iancu
*Director of the United States Patent and Trademark Office*

CERTIFICATE OF CORRECTION (continued)
U.S. Pat. No. 10,726,151 B2

In Column 6, Line 1, delete "un-redacted" and insert --unredacted--.

In Column 6, Line 10, delete "selected in" and insert --selected--.

In Column 6, Line 34, delete "images(s)" and insert --image(s)--.

In Column 6, Line 36, delete "un-redacted" and insert --unredacted--.

In Column 6, Line 37, delete "un-redacted" and insert --unredacted--.

In Column 6, Line 38, delete "documents(s)" and insert --document(s)--.

In Column 7, Line 16, delete "bank" and insert --a bank--.

In Column 8, Line 38, delete "un-redacted" and insert --unredacted--.

In Column 8, Line 39, delete "un-redacted" and insert --unredacted--.

In Column 8, Line 53, delete "selected" and insert --selected cell--.

In Column 9, Line 35, delete "the of" and insert --the size of--.

In Column 10, Line 5, delete "my" and insert --may--.

In Column 10, Line 51, delete "PhotoShop)" and insert --Photoshop)--.

In Column 11, Line 31, delete "uniform," and insert --uniform--.

In Column 11, Line 61, delete "detect" and insert --detect.--.

In Column 12, Line 31, delete "PhotoShop." and insert --Photoshop.--.

In Column 12, Line 58, delete "mote" and insert --more--.

In Column 14, Line 23, delete "images" and insert --image--.

In the Claims

In Column 18, Line 2, Claim 11, delete "identifier;]" and insert --identifier;--.